United States Patent
Aiello, Jr. et al.

(10) Patent No.: US 6,337,745 B1
(45) Date of Patent: *Jan. 8, 2002

(54) ROUTING PRINT JOBS

(75) Inventors: Albert Aiello, Jr., Wellesley; Clive H. Moss, Winchester, both of MA (US)

(73) Assignee: FMR Corp., Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,269

(22) Filed: Sep. 5, 1997

Related U.S. Application Data

(62) Division of application No. 08/609,776, filed on Mar. 1, 1996.

(51) Int. Cl.[7] .............................................. G06K 15/00
(52) U.S. Cl. ...................................... 358/1.15; 358/1.1
(58) Field of Search ................................. 395/101, 106, 395/109, 112, 114, 117, 200.3, 200.31, 200.43, 200.47, 200.48, 200.49, 200.72; 358/444, 468, 407, 404, 1.1, 1.6, 1.4, 1.13, 1.15, 1.17; 709/203, 200, 201, 213, 217, 218, 219, 242; 382/276, 309, 284

(56) References Cited

U.S. PATENT DOCUMENTS

| | | | |
|---|---|---|---|
| 5,165,014 A | 11/1992 | Vassar | 394/112 |
| 5,220,674 A | 6/1993 | Morgan et al. | 395/800 |
| 5,287,194 A * | 2/1994 | Lobiondo | 358/296 |
| 5,303,336 A | 4/1994 | Kageyama et al. | 395/114 |
| 5,353,388 A | 10/1994 | Motoyama | 395/117 |
| 5,450,571 A | 9/1995 | Rosekrans et al. | 395/500 |
| 5,467,434 A | 11/1995 | Hower, Jr. et al. | 395/114 |
| 5,475,801 A | 12/1995 | Brindle et al. | 395/114 |
| 5,513,126 A | 4/1996 | Harkins et al. | 364/514 A |
| 5,537,626 A | 7/1996 | Kraslavsky et al. | 395/828 |
| 5,577,172 A | 11/1996 | Vatland et al. | 395/114 |
| 5,580,177 A | 12/1996 | Gase et al. | 400/61 |
| 5,590,245 A * | 12/1996 | Leamy et al. | 395/118 |
| 5,594,840 A | 1/1997 | Sahay et al. | 395/113 |
| 5,596,723 A | 1/1997 | Romohr | 395/200.16 |
| 5,625,757 A | 4/1997 | Kageyama et al. | 395/113 |
| 5,638,497 A | 6/1997 | Kimber et al. | 395/114 |
| 5,699,493 A * | 12/1997 | Davidson, Jr. et al. | 395/114 |
| 5,699,494 A | 12/1997 | Colbert et al. | 395/114 |
| 5,727,135 A | 3/1998 | Webb et al. | 395/113 |
| 5,754,747 A * | 5/1998 | Reilly et al. | 395/114 |
| 5,799,147 A | 8/1998 | Shannon | 714/6 |
| 5,940,186 A * | 8/1999 | Barry et al. | 358/296 |

* cited by examiner

*Primary Examiner*—Gabriel I. Garcia
(74) *Attorney, Agent, or Firm*—Fish & Richardson P.C.

(57) ABSTRACT

A method for open systems printing including routing print jobs automatically from different types of source computers to different types of printers without the source computers selecting printers for each print job. A method for open systems printing including routing print jobs automatically from an arbitrary number of source computers to an arbitrary number of printers without the source computers selecting printers for each print job. A method for printing including controlling the printing of print jobs on high-speed production printers through a graphical user interface. A print server for use with different types of source computers and different types of printers, the print server directs print jobs received from the source computers to the printers without the source computers selecting printers for each print job. A print server for use with an arbitrary number of. similar types of source computers and an arbitrary number of similar types of printers, the print server directs print jobs received from the source computers to the printers without the source computers selecting printers for each print job.

19 Claims, 31 Drawing Sheets

Microfiche Appendix Included
(17 Microfiche, 1648 Pages)

| | | | OPServer Job Queue Status Display-Covington TestServer | | | | | | |
|---|---|---|---|---|---|---|---|---|---|
| File | Edit | View | Operations | Refresh | | | | | Help |

| | | | Current View - All Jobs | | | | | | |
|---|---|---|---|---|---|---|---|---|---|
| NAME | NU | By Class | S | PRI | TOTAL | PRINTED | STATUS | PRINTER MODE | QUEUE TIME | SOURCE | OWNER |
| AWH3GB | JO | By Priority... | ▲ | 1 | 66000 | 17 | HOLD | PAGE | 20 | 20:35 | AWH2_SVR | AWH |
| PDAD334 | JO | By Source | ▲ | 2 | 23 | 24 | COMPLETED | PAGE | 19 | 02:39 | CPU6 | UCC7 |
| FPRDI74 | JO | By Status | ▲ | 4 | 1286 | 1202 | READY | PAGE | 19 | 02:37 | CPU6 | UCC7 |
| FCIND80A | JO | By Mode | ▲ | 3 | 8865 | 2118 | HOLD | PAGE | 14 | 19:20 | CPU6 | UCC7 |
| FCIND81 | JO | By Name... | | 3 | 143 | 0 | HOLD | PAGE | 14 | 19:19 | CPU6 | UCC7 |
| FMEGD81 | JO | By Form... | | 3 | 98 | 0 | HOLD | PAGE | 14 | 19:19 | CPU6 | UCC7 |
| FNASD81 | JO | Criteria... | | 3 | 110 | 0 | READY | PAGE | 14 | 19:19 | CPU6 | UCC7 |
| FCIND81 | JO | All Jobs | | 3 | 143 | 0 | HOLD | PAGE | 14 | 19:18 | CPU6 | UCC7 |
| FDALD81 | JOB25598 | 1491 | t | 2 | 444 | 99 | HOLD | PAGE | 14 | 19:15 | CPU6 | UCC7 |
| FMED174 | JOB19617 | 4054 | t | 1 | 2072 | 1499 | HOLD | LINE | 13 | 19:10 | CPU6 | UCC7 |
| FNADI27 | JOB30704 | 1491 | t | 4 | 1467 | 0 | HOLD | PAGE | 9 | 01:00 | CPU1 | UCC7 |
| FNADI74 | JOB27852 | 1491 | t | 12 | 1414 | 0 | HOLD | PAGE | 9 | 23:31 | CPU6 | UCC7 |
| FCID174 | JOB27852 | 1491 | t | 5 | 2135 | 0 | READY | PAGE | 9 | 23:21 | CPU6 | UCC7 |
| FCID174 | JOB01309 | 1491 | t | 2 | 1699 | 0 | READY | PAGE | 9 | 23:19 | CPU6 | UCC7 |
| FBRPD30 | JOB28532 | F200 | t | 1 | 30482 | 1135 | HOLD | PAGE | 9 | 23:13 | CPU6 | UCC7 |

Criteria Display

Class [T]
Status  Ready ☐    Name [ ]
Source  Any ☐      Form [ ]
Mode    Any ☐      Priority (0-All) [ ]
                   ☐ Active

[OK]  [Apply]  [Cancel]  [Help]

Report Queue FNAD174-JOB30704  —  Help

| File | Operations | | | | | | | |
|------|------|-----|-----|------|-------|---------|---------|--------|
| NAME | Hold | CLS | STATUS | MODE | TOTAL | PRINTED | PRINTER | RPT ID |
| FNAD17 | Release | T | COMPLETED | PAGE | 6 | 7 | | 60200 |
| FNAD17 | Delete... | T | HOLD | PAGE | 1361 | 0 | | 50128 |
| FNAD17 | Print... | T | READY | PAGE | 5 | 0 | | 25200 |
| FNAD17 | Resources... | T | READY | PAGE | 10 | 0 | | 38280 |
| FNAD17 | View Report Ticket... | T | READY | PAGE | 6 | 0 | | 63312 |
| FNAD17 | | T | READY | PAGE | 6 | 0 | | 49328 |
| FNAD17 | Browse Report... | T | READY | PAGE | 6 | 0 | | 15088 |
| FNAD17 | | T | READY | PAGE | 6 | 0 | | 33712 |

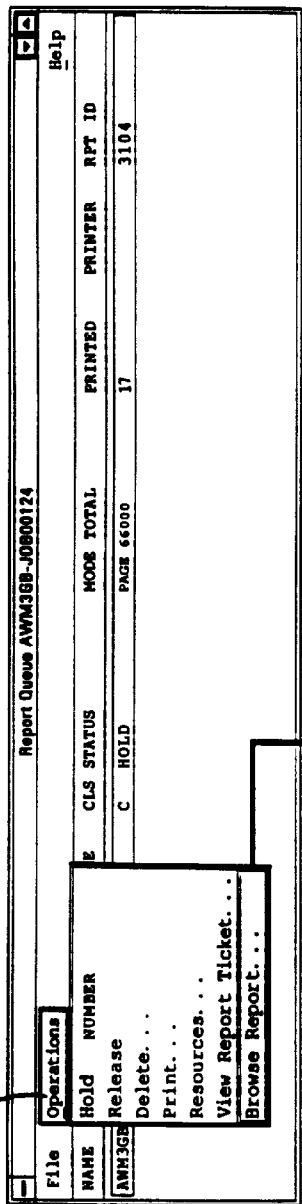
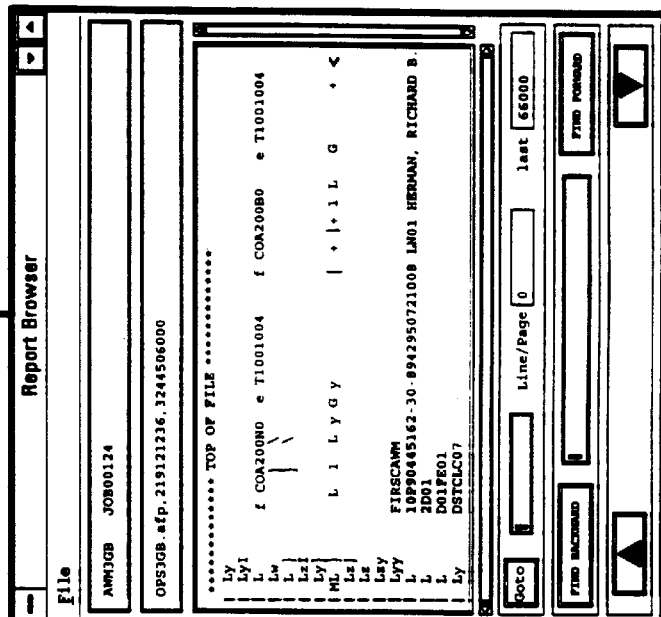
FIG. 26

ROUTING PRINT JOBS

This is a divisional of copending application Ser. No. 08/609,776 filed Mar. 1, 1996.

BACKGROUND

This invention relates to open systems printing.

Printing is often a proprietary sub-system of computer operating systems. This is especially true for production or high-speed printing (i.e., greater than 100 pages per minute). For example, IBM™ MVS™ mainframes 10, 12 (FIG. 1) are connected to IBM™ printers 14, 16 over IBM™ bus-and-tag channels 18, 20, Microsoft™ NT™ server 22 is connected to NT™ printer 24 over proprietary bus 26, and image server 28 is connected to image printers 30 over proprietary busses 32. In a typical MVS™ environment, print files are generated from a mainframe MVS™ application and sent to a Job Entry Sub-System (JES). The print job is routed over the proprietary bus to a printer directly connected to the proprietary bus. The job is then printed using JES commands.

When new processors are developed and installed, new printers corresponding to the new technology are also installed. Dedicated, high-bandwidth channel bus extenders are used to connect remote high-speed printers to a central mainframe location.

Client/server systems typically include smaller desktop computers (clients) connected to larger more powerful computers (servers). To print a client/server print stream on a high-speed printer, the print stream is typically routed (arrow 34) to a mainframe, e.g., MVS™ 10, and then routed to a high-speed printer, e.g., printers 14. The mainframe is effectively made a high-cost print server for the distributed client/server system.

Switch 36 enables either MVS™ 12 or a VAX™ mainframe 38 to send print streams to printer 40. If MVS™ 12 is configured to send print streams through switch 36 and a user instead wants to send print streams from VAX™ 38 to the printer, the user enables the VAX™ and disables the MVS™ and configures the switch accordingly. Approximately 20 minutes to an hour is required to re-configure the mainframes and switch. A new switch is needed to allow a different hardware platform, e.g., NT™ server 22, to share a printer with MVS™ 12 and/or VAX™ 38.

SUMMARY

In general, in one aspect, the invention features a method for open systems printing including routing print jobs automatically from different types of source computers to different types of printers without the source computers selecting printers for each print job. In general, in another aspect, the invention features a method for open systems printing including routing print jobs automatically from an arbitrary number of source computers to an arbitrary number of printers without the source computers selecting printers for each print job.

Implementations of the invention may include one or more of the following. Routing may include sending the print jobs from the source computers to a print server and sending the print jobs from the print server to output managers connected to the printers. The print jobs may be sent from the source computers to the print server over a first network, e.g., a TCP/IP network, and the print jobs may be sent from the print server to the output managers over a second network, e.g., a local area network. The method may include transforming data in the print jobs into a format compatible with the printers, and the transformation may be carried out by the print server or an output manager. After sending the print jobs from the source computers to the print server, the method may include storing the print jobs in a server spool coupled to the print server. Before sending the print jobs from the print server to the output managers, the data in the print jobs may be manipulated, for example, two print jobs may be merged into one print job. The method may also include printing the print jobs on paper, sending the print jobs to an electronic mail system, recording the print jobs on microfiche, and recording the print jobs on laser disk. Each of the print jobs may include at least two reports and routing may include sending the print jobs from the source computers to a print server and sending individual reports from the print server to output managers connected to the printers. After sending the print jobs from the source computers to the print server, the method may include bringing the source computers down for maintenance while printing the print jobs.

In general, in another aspect, the invention features a method for printing including controlling the printing of print jobs on high-speed production printers through a graphical user interface.

Implementations of the invention may include one or more of the following. The method may include receiving the print jobs at a print server coupled to the graphical user interface and listing the received print jobs in the graphical user interface. Controlling may include selecting a print job from the list of received print jobs, determining if a printer coupled to the print server has a set-up compatible with the selected print job's set-up, and sending the selected print job from the print server to an output manager connected to the printer. Selecting may include dragging-and-dropping the selected print job from the list of print jobs onto a printer icon, and the method may also include preventing the drag-and-drop of the selected print job if the printer set-up is determined to be incompatible with the selected print job's set-up.

In general, in another aspect, the invention features a print server for use with different types of source computers and different types of printers, the print server directs print jobs received from the source computers to the printers without the source computers selecting printers for each print job. In general, in another aspect, the invention features a print server for use with an arbitrary number of similar types of source computers and an arbitrary number of similar types of printers, the print server directs print jobs received from the source computers to the printers without the source computers selecting printers for each print job.

Implementations of the invention may include one or more of the following. The print server may include an input receiver, coupled to the source computers, for receiving the print jobs from the source computers, a server spool, coupled to the input receiver, for storing received print jobs, a queue manager, coupled to the server spool and the input receiver, for directing each of the print jobs to a selected one of the printers through an output manager, and a data transformer, coupled to the server spool, for converting data in print jobs into a format compatible with the corresponding selected printers.

In general, in another aspect, the invention features an open systems printing environment including a source computer connected to a first network, a print server connected to the first network and a second network, an output manager connected to the second network, and a printer connected to the output manager, the print server directs print jobs generated by the source computer to the printer.

Implementations of the invention may include one or more of the following. The open systems printing environment may also include a server spool coupled to the printer server and a graphical user interface coupled to the print server.

Advantages of the invention may include one or more of the following. Print streams generated on an arbitrary number of dissimilar/similar types of source computers, including client/server systems, are efficiently routed to an arbitrary number of dissimilar/similar high speed printing hardware. User application programs on source computers need not be modified, and the number of source computers and the number of printers is scalable. New technology (i.e., types of computers and printing hardware) is easily added to the printing system. Local print management provides cost effective operation of a large print center remote from a data center. A graphical user interface (GUI) provides a flexible, easy-to-use operator interface. Printing may continue when source computers are down for maintenance or due to failures.

Print streams generated by source computers may be manipulated in the open print server prior to being routed to available printing hardware. For example, bank statement data from a mainframe may be merged with image data (i.e., pictures of processed checks) from an image server before being routed to available printing hardware. Merging print streams in the open print server prior to printing reduces the handling required to process the merging of two print streams and reduces errors associated with known physical merging techniques.

Other advantages and features will become apparent from the following description, and from the claims.

DESCRIPTION

FIGS. 6–31 are video screen displays of a graphical user interface to an open systems printing environment.

Figure 1:
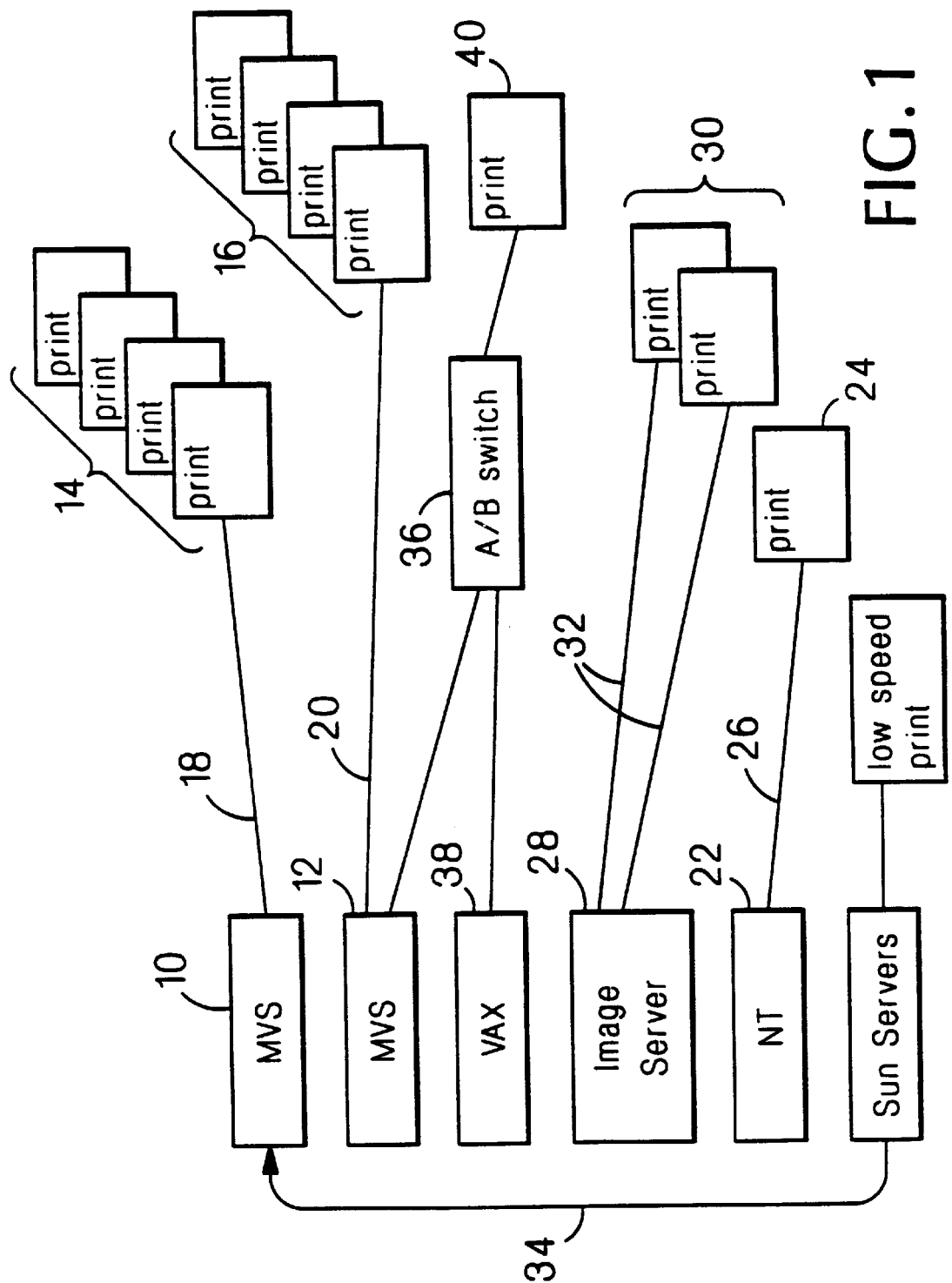
FIG. 1 is a block diagram of source computers directly connected to printers.
Figure 2:
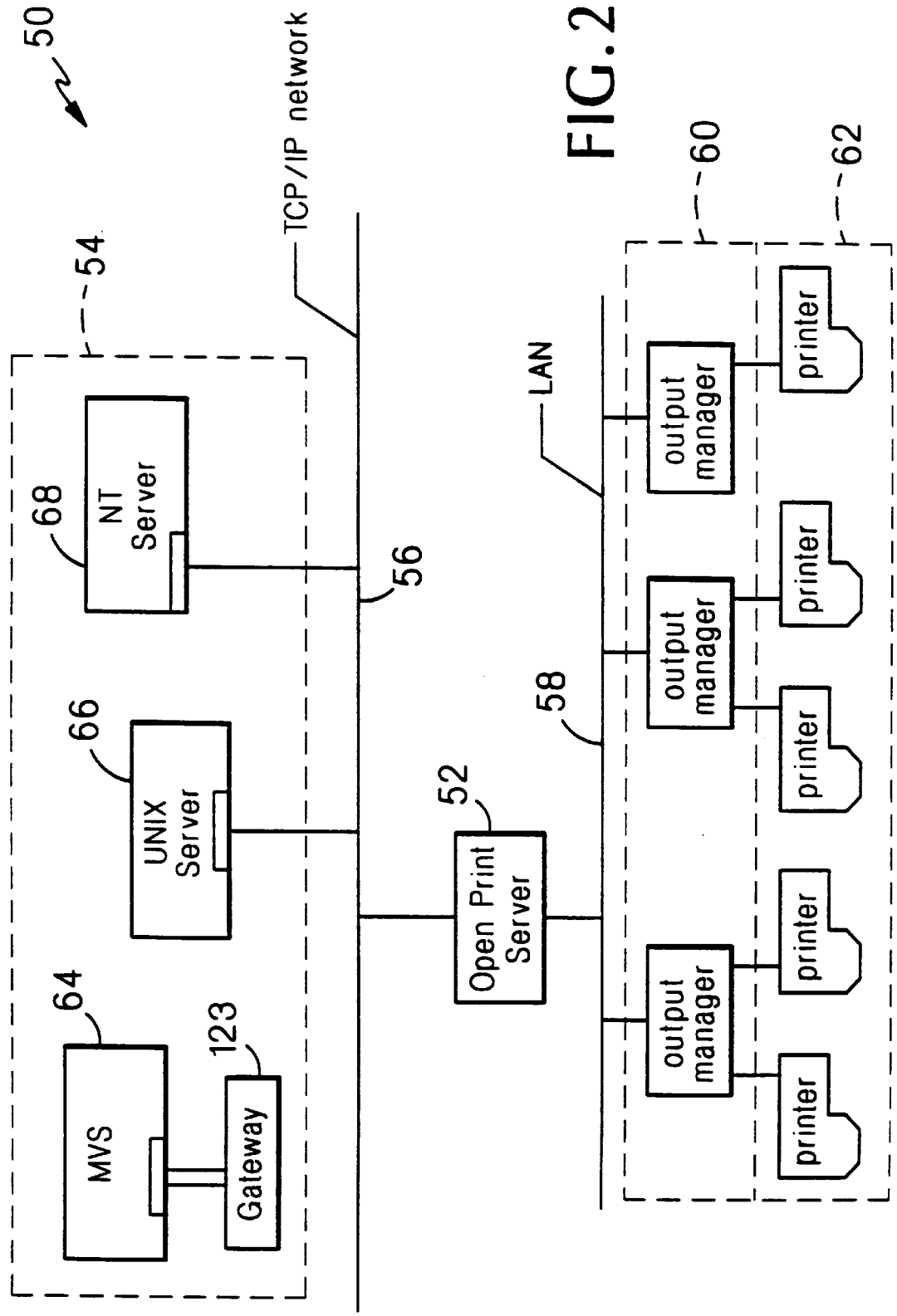
FIGS. 2 and 3 are a block diagrams of an open systems printing environment.

Referring to FIG. 2, an open systems printing environment 50 includes an open print server 52 connected to source computers 54 through a Transmission Control Protocol/Internet Protocol (TCP/IP) network 56. The open print server receives print jobs from the source computers and efficiently routes the jobs over a local area network (LAN) 58 to various output managers 60. The output managers then have the jobs printed on directly connected printers 62.

Figure 3:
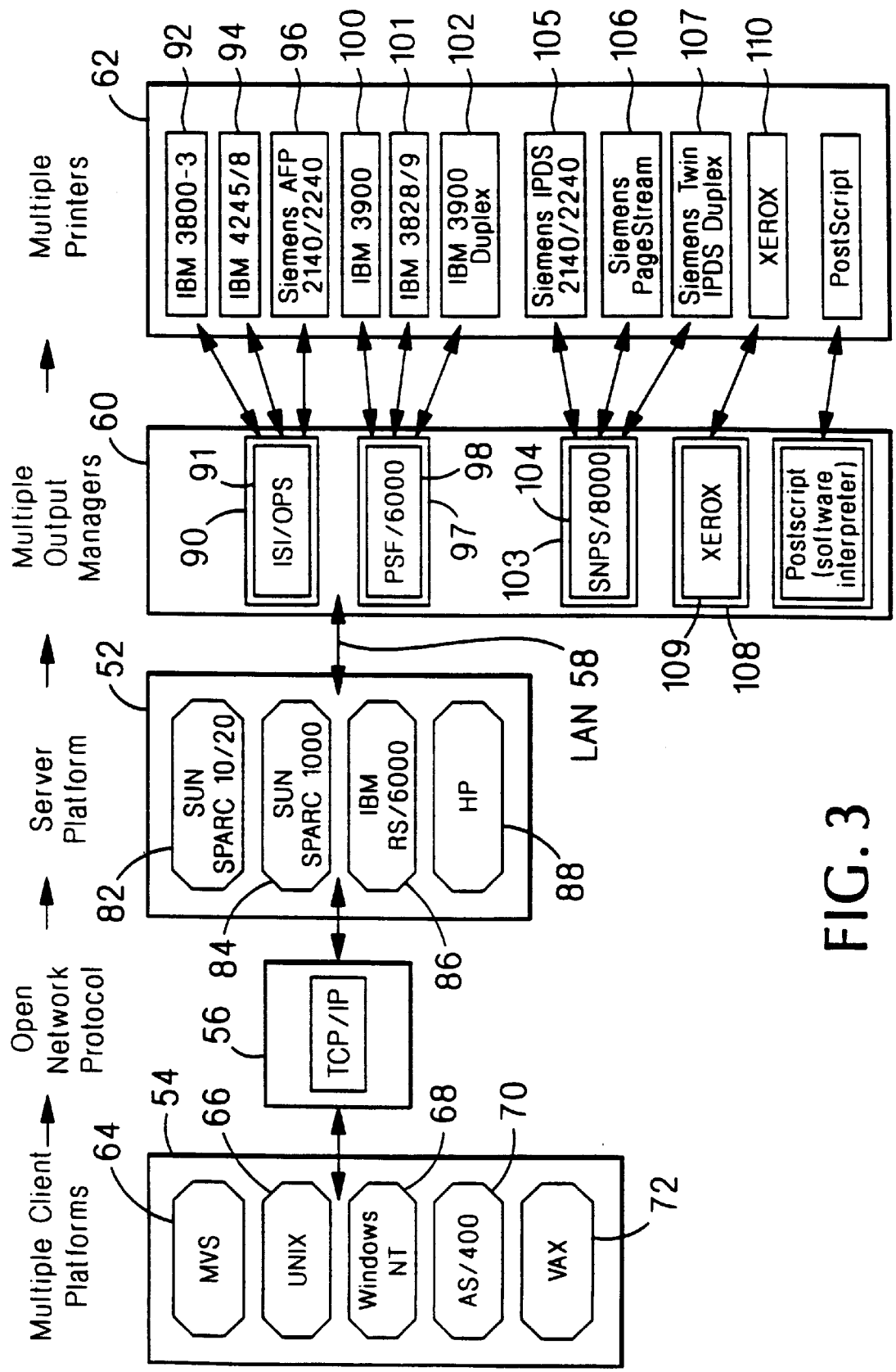

TCP/IP is a communications protocol that was developed under contract from the United States Department of Defense in the 1970's to connect dissimilar computer systems. Today TCP/IP is a defacto standard after becoming the network protocol of choice for corporate data networks. TCP/IP is flexible and available on a wide range of hardware platforms. The protocol enables programmatic linking and routing of data between dissimilar computer systems. As a result, the open print server accepts print files from different hardware platforms, including IBM™ MVS™ mainframes 64 (FIGS. 2 and 3), UNIX servers 66, Microsoft™ Windows NT™ servers 68, IBM™ AS/400 servers 70, and Digital Equipment Corporation™ VAX™ mainframes 72.

Figure 4:
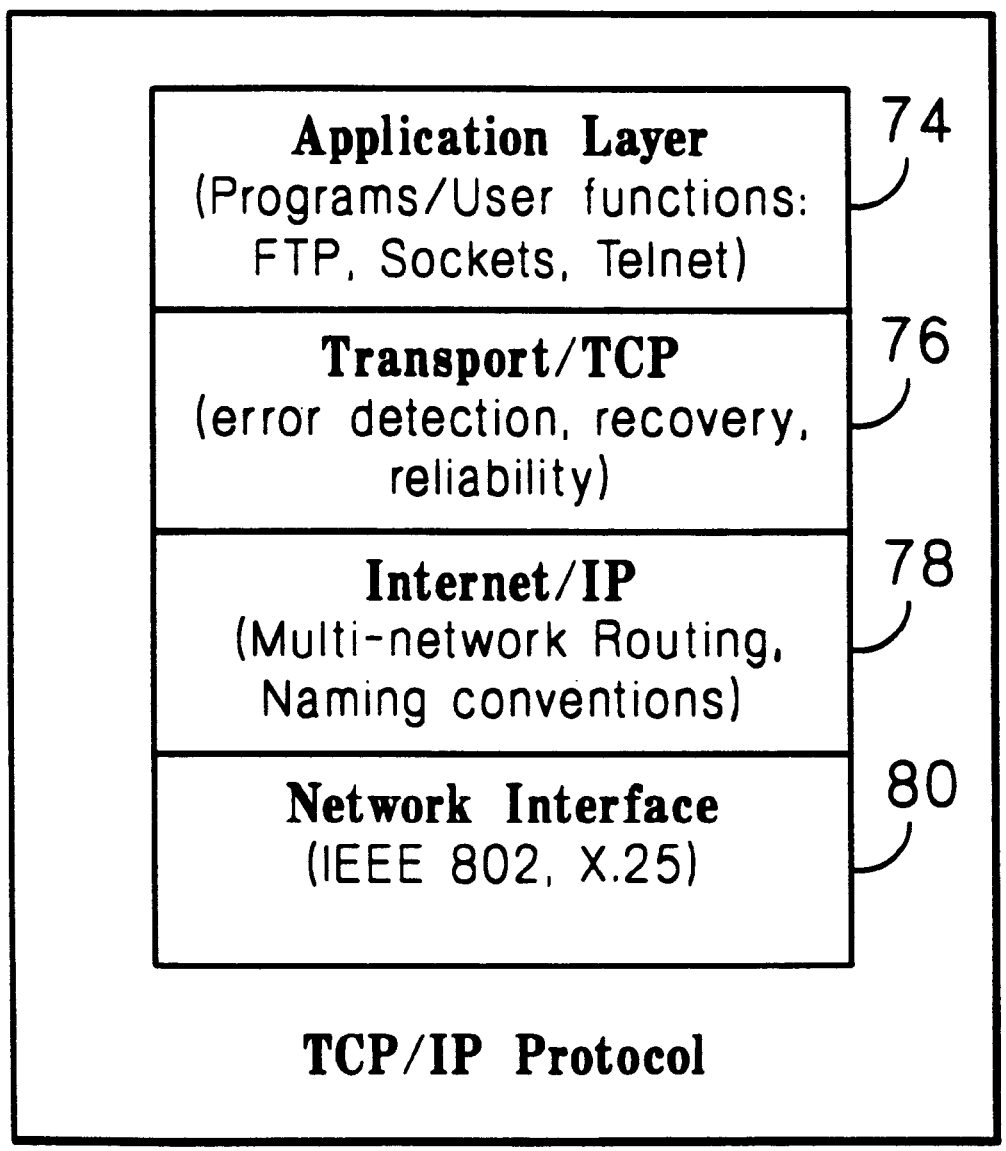
FIG. 4 is a block diagram of the TCP/IP protocol stack.

The highest level of TCP/IP is Application Layer 74 (FIG. 4). User level programming is incorporated at the top of the TCP/IP protocol stack at the Application layer. For example, File Transfer Protocol (FTP) is an application layer program. The Application Layer permits computers to connect to and work together over the network.

TCP layer 76 defines the transport standard, providing end-to-end reliability and sequencing of transmitted bytes of data. This ensures that each byte of data sent from a source computer is received correctly by the open print server. IP layer 78 of the TCP/IP protocol stack provides the routing mechanism/computer addressing information. Addressing information is used to forward bytes from source computers to the open print server. Network Interface layer 80 defines the physical attributes of the network connection.

Many hardware platforms may serve as the open print server. For instance, the open print server may be a Sun™ SPARC™ 10/20 server 82 (FIG. 3), a Sun™ SPARC™ 1000 server 84, an IBM™ RS/6000 server 86, or a Hewlett Packard™ server 88. Many output managers and printers are also available. The printers may be Advance Function Printing (AFP) in Page or Line mode printers, intelligent printer data stream (IPDS) printers, impact, simplex, DUPLEX, line conditioned data stream (LCDS) and intelligent print stream (IPS), roll-fed, sheet-fed, postscript, color, or continuous tone printers. For example, an output manager 90 including an ISI/OPS printer driver 91 may receive print jobs from the open print server and direct them to IBM™ 3800-3 and 4245/8 printers 92, 94 and Siemens™ 2140/2240 page mode printers 96. Similarly, an output manager 97 including a PSF/6000 printer driver 98 may direct print jobs to IBM™ 3900, 3828/9, and 3900 duplex printers 100, 101, 102, an output manager 103 including a SNPS/8000 printer driver 104 may direct print jobs to Siemens™ 2140/2240 IPDS printers 105, Siemens™ page stream printers 106, and Siemens™ twin duplex printers 107, and an output manager 108 including a XEROX™ printer driver 109 may direct print jobs to a XEROX™ printer 110.

Figure 5:
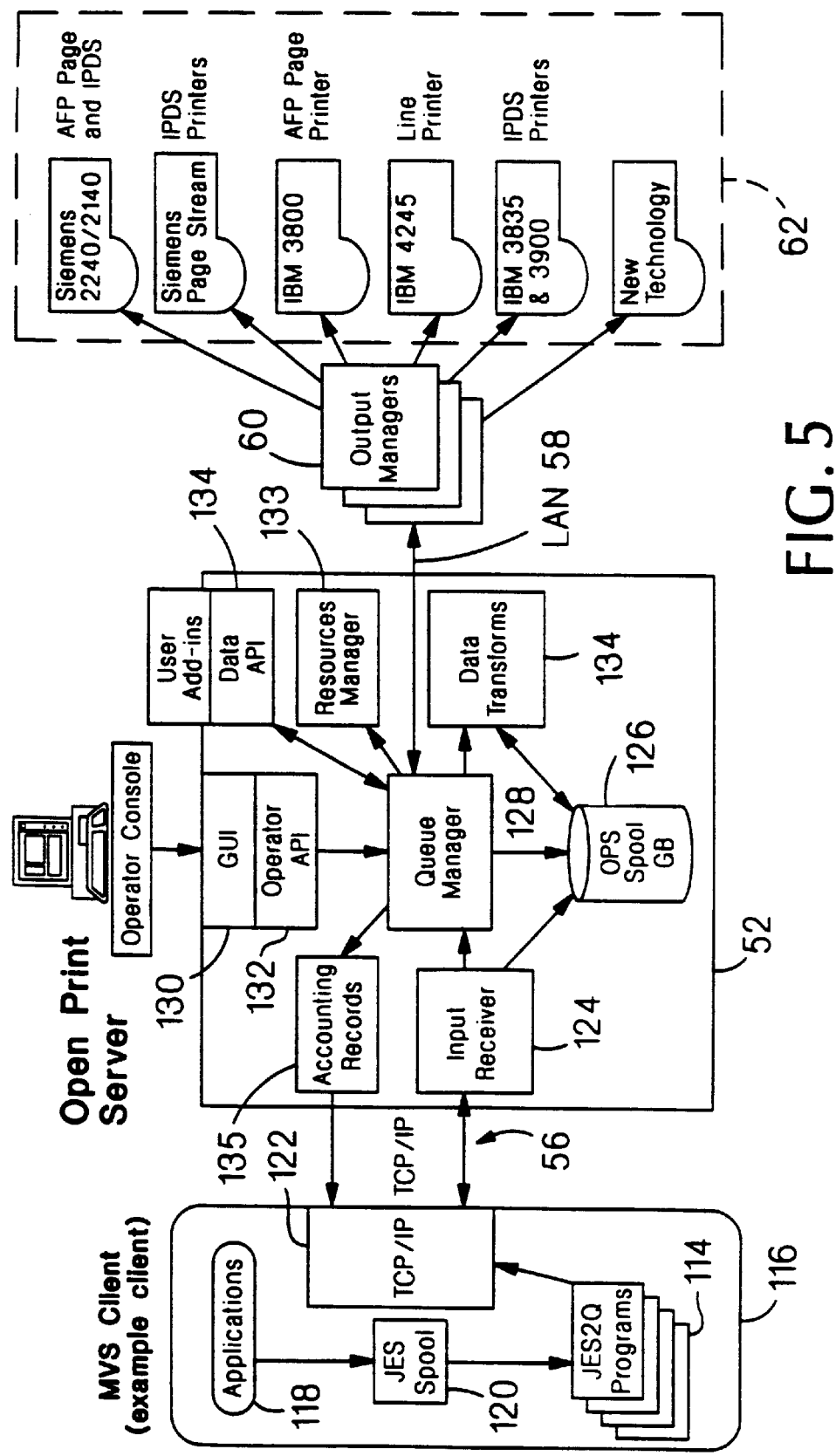
FIG. 5 is a detailed block diagram of an open systems printing environment.

Referring to FIG. 5, an open printing client program 114 is installed on each source computer 116 to transfer print files from the source computers to open print server 52 over TCP/IP network 56 without modifying applications running on the source computers. As an example, source computer 116 is an IBM™ MVS™ mainframe. Application 118 running on the MVS™ mainframe transfers print files into a Job Entry Sub-system (JES) which stores the print jobs on one or more MVS™ JES spools 120. Program 114 includes a JES2Q Program for each JES spool available to the MVS™ mainframe. Each JES2Q program searches a corresponding JES spool for print jobs having a destination identification (DESTID) corresponding to an open print server.

The JES2Q programs "strip" print jobs destined for the open print server from the JES spools, add open print server header information to the print jobs, and encapsulate the print jobs into TCP packets. The TCP packets are transferred to the open print server. The JES2Q programs interface with a TCP/IP stack 122 to pass print jobs to TCP/IP network routers via, for example, an IBM™ 3172 gateway 123 (FIG. 2). The routers send the print jobs over the TCP/IP network to an input receiver 124 on the open print server. The JES2Q programs communicate with the input receiver program through a sockets interface (program-to-program) in the Application level of the TCP/IP protocol stack in a many-to-one relationship.

When the input receiver receives incoming print jobs, it writes the data onto a server spool 126 and uses the header information to log the job in a database, for example, a Sybase, Inc. database. Server spool 126 is a direct access storage device (DASD) and may include mirrored disks. The array contains, for example, four 16 gigabyte partitions which provide a total capacity of 64 gigabytes. File sizes may exceed the UNIX limit of 2 gigabytes. The input receiver notifies Queue Manager 128 of the status of all incoming print jobs.

Open print server error conditions, for instance, insufficient disk space or failed network lines, are communicated to the JES2Q programs on the MVS™ mainframe through TCP/IP error codes. When the error condition is removed, e.g., disk space becomes available, the print job is restarted. Checkpoint restart capabilities allow the print job transmission to be re-initiated from the point of failure reducing the time required to finish the transmission.

The Queue Manager functions as a traffic cop by controlling the distribution of print jobs across the various printers. The Queue Manager forwards database update information to one or more Motif™ graphical user interfaces 130 (GUIs) through an operator application programming interface 132 (API). The GUIs provide print operators with a current view of the printing environment (discussed in more detail below). The Queue Manager also processes commands received from the operator via the GUI and updates the database accordingly. The Queue Manager maintains Job accounting files and server log files and stores these files on the server spool. Job accounting records 135 are generated in various formats, SMF included. These may be automatically sent to standard billing packages on other computers connected to the TCP/IP network.

While a print job is being received from a source computer, the Queue Manager accesses the print job's header information to determine which print resources are required to print the job and then accesses a resource manager 133 to determine if the required print resources are available. Print resources include fonts, coded fonts, overlays, page definitions, form definitions, page segments, FCBs, media maps, data maps, and graphics (e.g., logos and signatures). If a required print resource is not available, then the Queue Manager notifies the operator through the GUI. Similarly, the Queue Manager checks for a required printer set-up, for example, that a required form type is loaded, and notifies the operator if a required printer set-up is not available.

Using the GUI, a print operator selects a job in the server spool and directs the job to a specific printer. The Queue Manager initiates a data transformation (DTF) process 134 corresponding to the selected output manager and printer. The DTF process interrogates the job to determine, for example, if it is an AFP page or line mode job. The DTF process then reads the job from the spool, converts the data stream to, for example, a channel command word (CCW) format compatible with the target printer make/model, and writes the data back onto the spool. The DTF process also updates the database with status information and error condition messages, and this information is made available to the GUI through the Queue Manager.

After a sufficient amount of data has been properly transformed, the Queue Manager notifies the selected output manager that a print job is ready, and the output manager begins reading the transformed portion of the print job from the server spool. For non-IPDS printers (i.e., Siemens™ 2140, 2240, IBM™ 3800, 4245), the output manager may be a Sun™ SparcClassic™ workstation with a printer adapter card to support the attached printer. For IPDS printers, the output manager may be an IBM™ RS/6000 workstation with PSF/6000 software or an OS/2 workstation with SNPS 8000 software and a Channel emulation card to support the attached printer. In the IPDS printing environment, the output manager reads data from the server spool that has not been transformed and completes the data transformation.

A programmer may generate data application programming interfaces 136 and corresponding DTF processes for manipulating data stored on the print server. For example, many bank statements include data forms listing transactions and account status (accounting data) as well as image forms with graphical representations of processed checks (image data). In the past, these forms were either printed separately and physically merged together before being mailed to the account holder, or the image data was routed to a mainframe where the image data and account data was merged before being printed. Physically merging forms is error prone and may require substantial personnel time. Because image data files are generally large, routing image data to the mainframe may cause bandwidth problems in the network connecting the image server and mainframe requiring the installation of an expensive, high bandwidth bus. This routing may also require a substantial amount of time. The problem is multiplied if the mainframe is remote from the image server.

Through the open print server, data is routed once to the open print server where it is merged into one print job before being printed. After an image print job and an accounting print job are stored in the server spool, the Queue Manager initiates a merge DTF through a merge data API to merge image and accounting data into one print job. An output manager corresponding to a printer capable of printing both data types is then notified of the print job.

LAN 58 (FIG. 5) and TCP/IP network 56 provide the open printing environment with scalability. Both networks permit many connections, for example, the LAN may have 256 connections. This allows additional source computers and output managers/printers to be easily connected to the environment when printing needs increase. Additionally, the environment may be updated with new technology, e.g., new source computers and output managers/printers, by generating corresponding open printing client programs 114 (FIG. 5) and DTF 134 processes.

Additionally, the TCP/IP network allows large print files to be easily and quickly transmitted from a data center of source computers to a remote print shop including the open print server, output managers, and printers. Because print resources are stored on the open print server, print file transmissions are smaller and require less bandwidth. Once the files are transmitted, the source computers may be brought down for maintenance without interrupting the printers. Local printer management permits efficient use of printer time and capabilities, and because the open print server routes print jobs across various printers, individual printers may be drained of print jobs and brought down for maintenance without bringing down the entire printing environment. Moving printer queue management to the open print server may increase source computer performance by eliminating the need for such a function on the source computers. Source computers need not select, keep track of, or even know of available printers.

Printing/Operator Interface

The GUI provides an operator with complete control over printer management.

Figure 6:
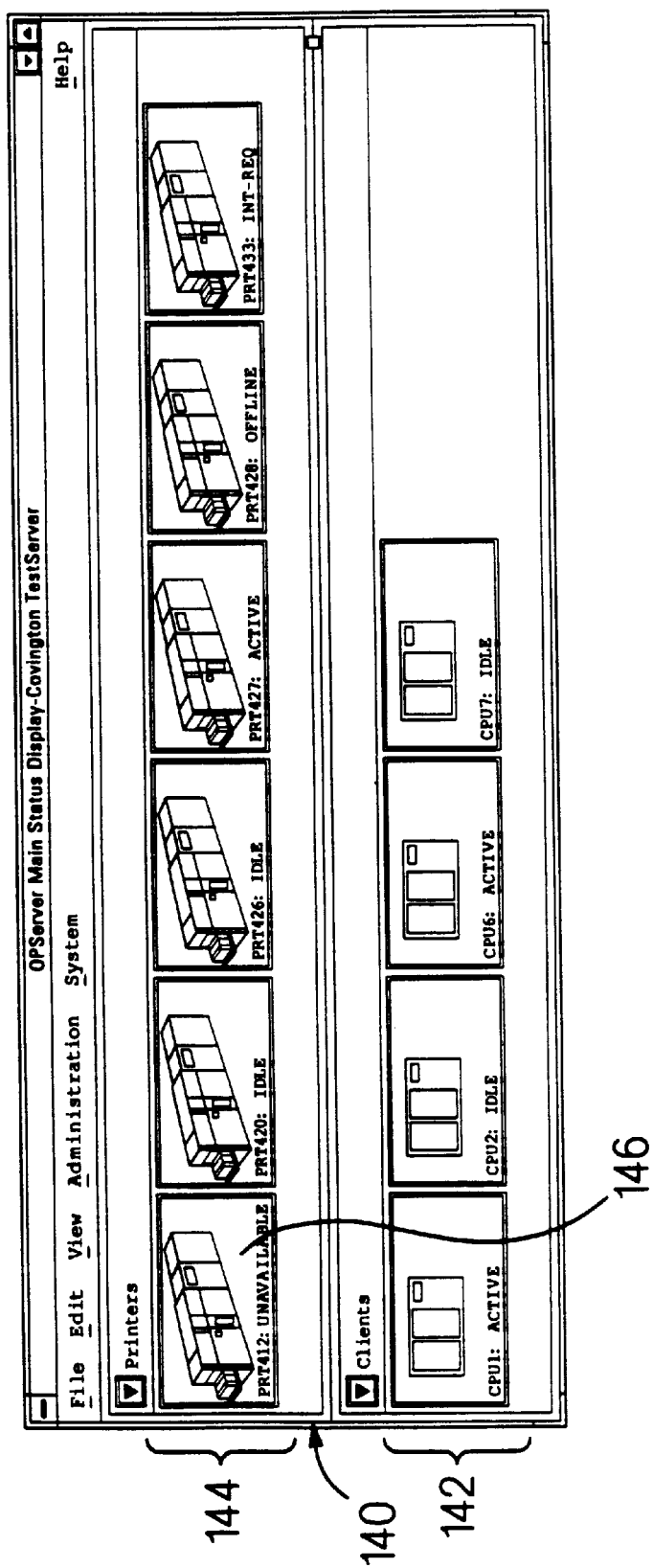

Referring to FIG. 6, the GUI includes a main status display 140 that allows the operator to manage the print operation, system configuration, and logging in and out of the system. In addition to standard Motif™ X-Windows™ features, the GUI includes features specific to the open print server. For example, source computer and printer icons 142, 144, respectively, are displayed and indicate through words 146 and the color of the icon the status of the corresponding device. For instance, a green printer icon indicates that the printer is active, paused, or draining, blue indicates that the printer is idle or drained, brown that the print driver is running but that the printer is unavailable, red that the print driver is unavailable, and yellow that operator intervention is required. Similarly, a green source computer icon indicates that the computer is active while a blue source computer icon indicates that the computer is idle.

The operator may double-click a left mouse button on a printer or client icon 142, 144, respectively, to cause additional information (e.g., forms, mode), specific to the corresponding device, to be displayed. A single-click of the right mouse button on a printer icon brings up a pop-up menu of printer functions including pause, resume, cancel job, drain, enable. The user may click the left mouse button on a printer function to cause the corresponding printer to execute that function.

Figure 7:
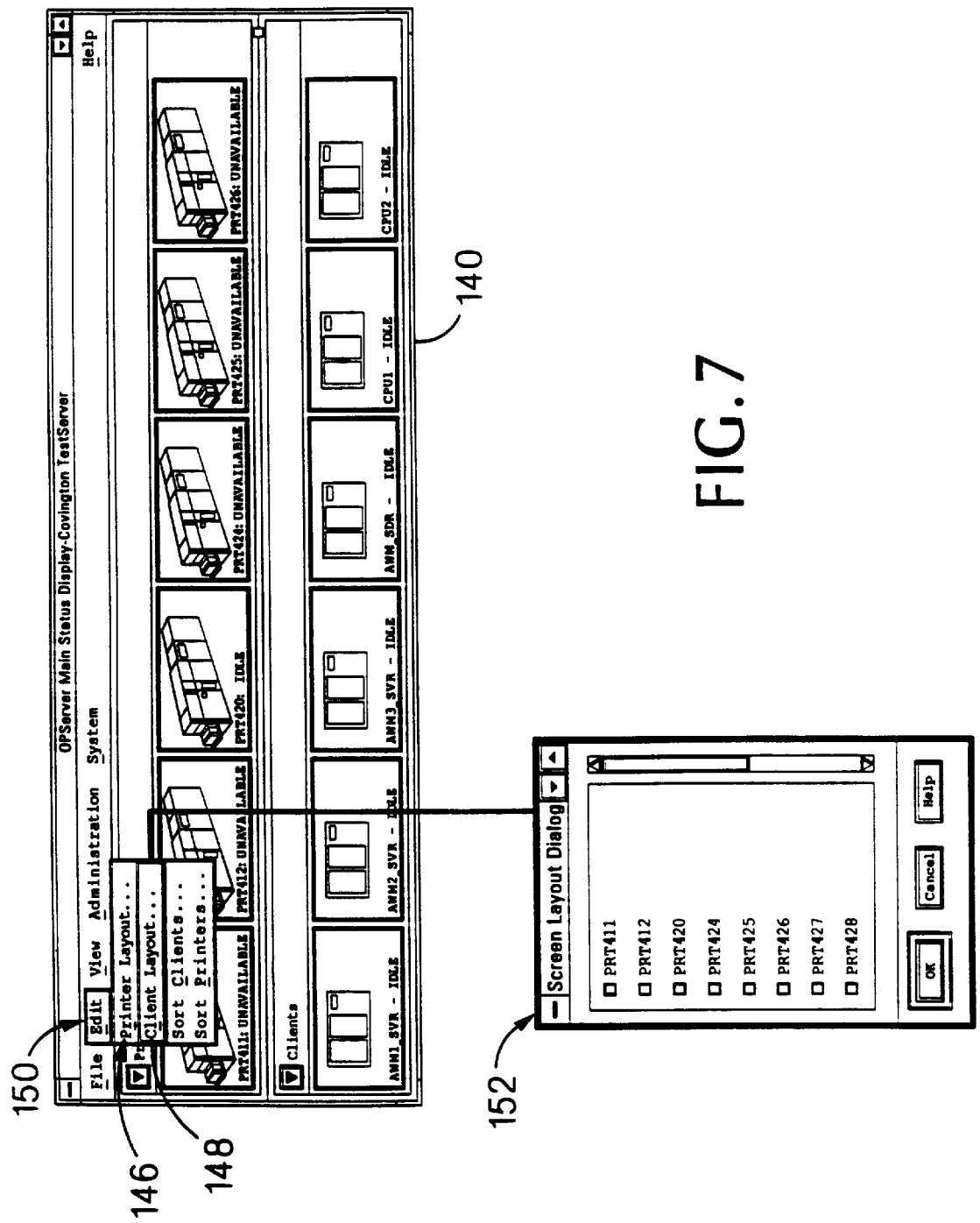
Figure 8:
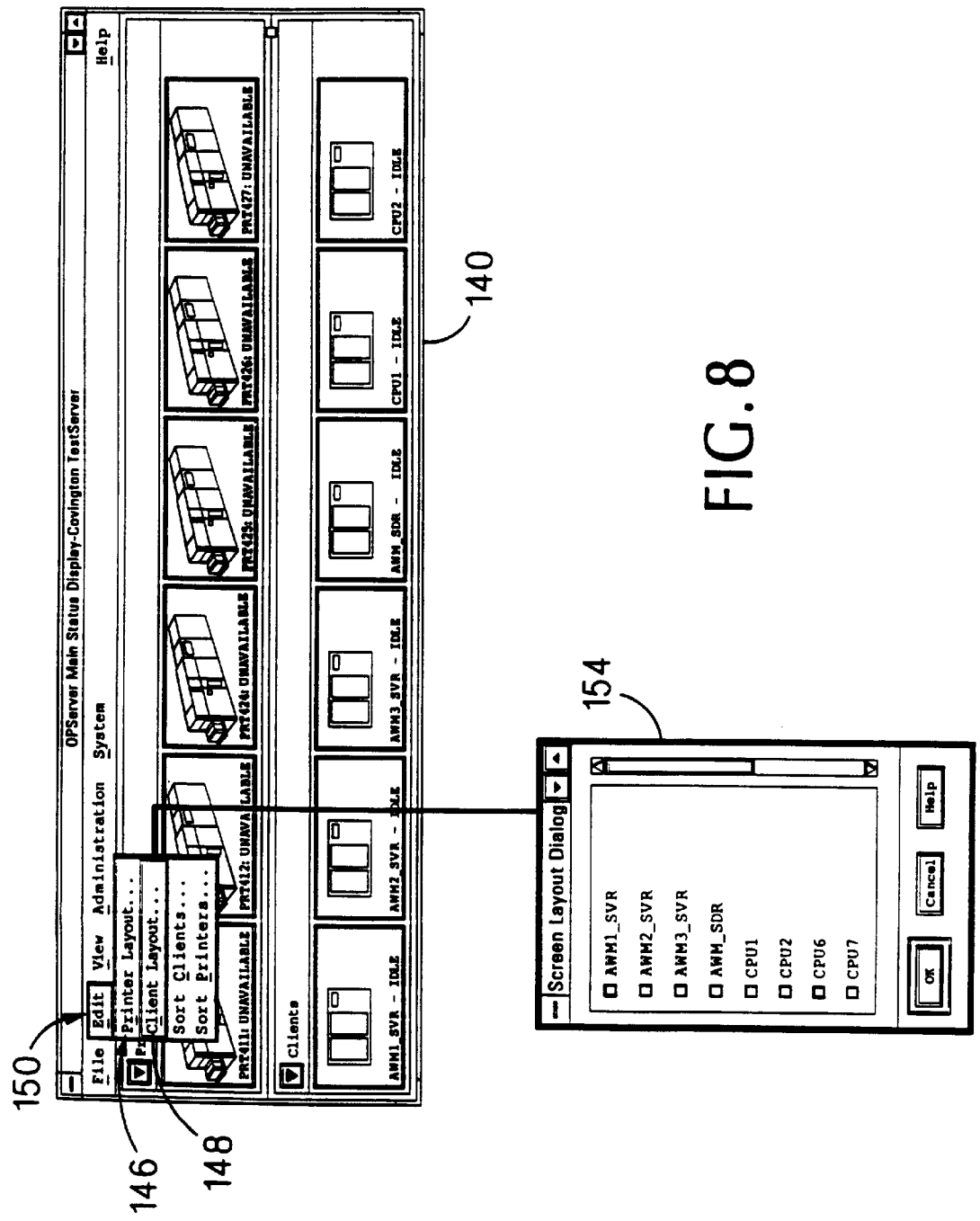

Referring to FIGS. 7 and 8, the operator may select a Printer Layout option 146 or a Client Layout option 148 from an Edit menu 150 to cause a Screen Layout Dialog box 152 or a Client Layout Dialog box 154, respectively, to appear. The operator then uses the dialog boxes to select those printer and source computer icons to be displayed on the main status display window.

Figure 9:
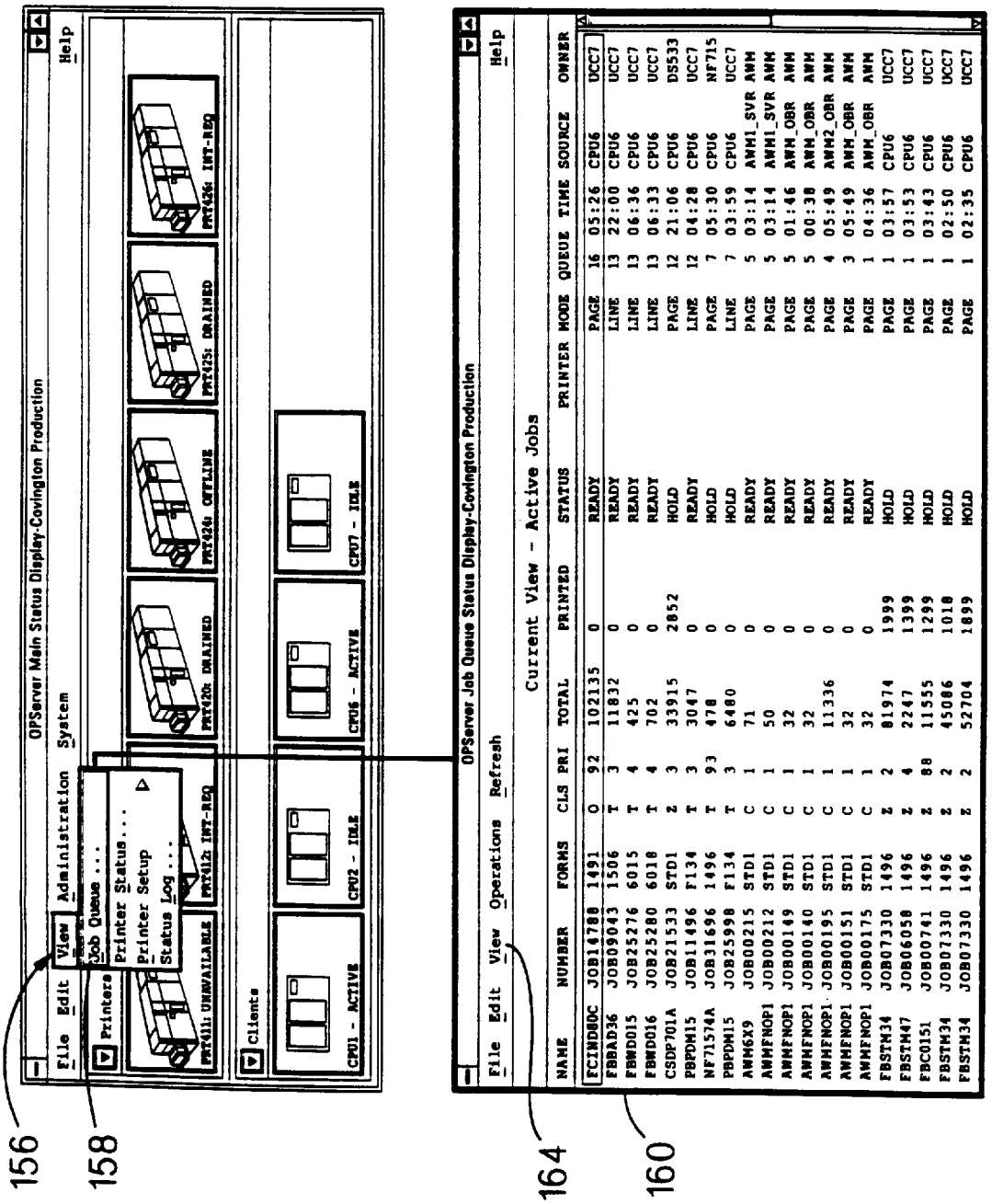
Figure 10:
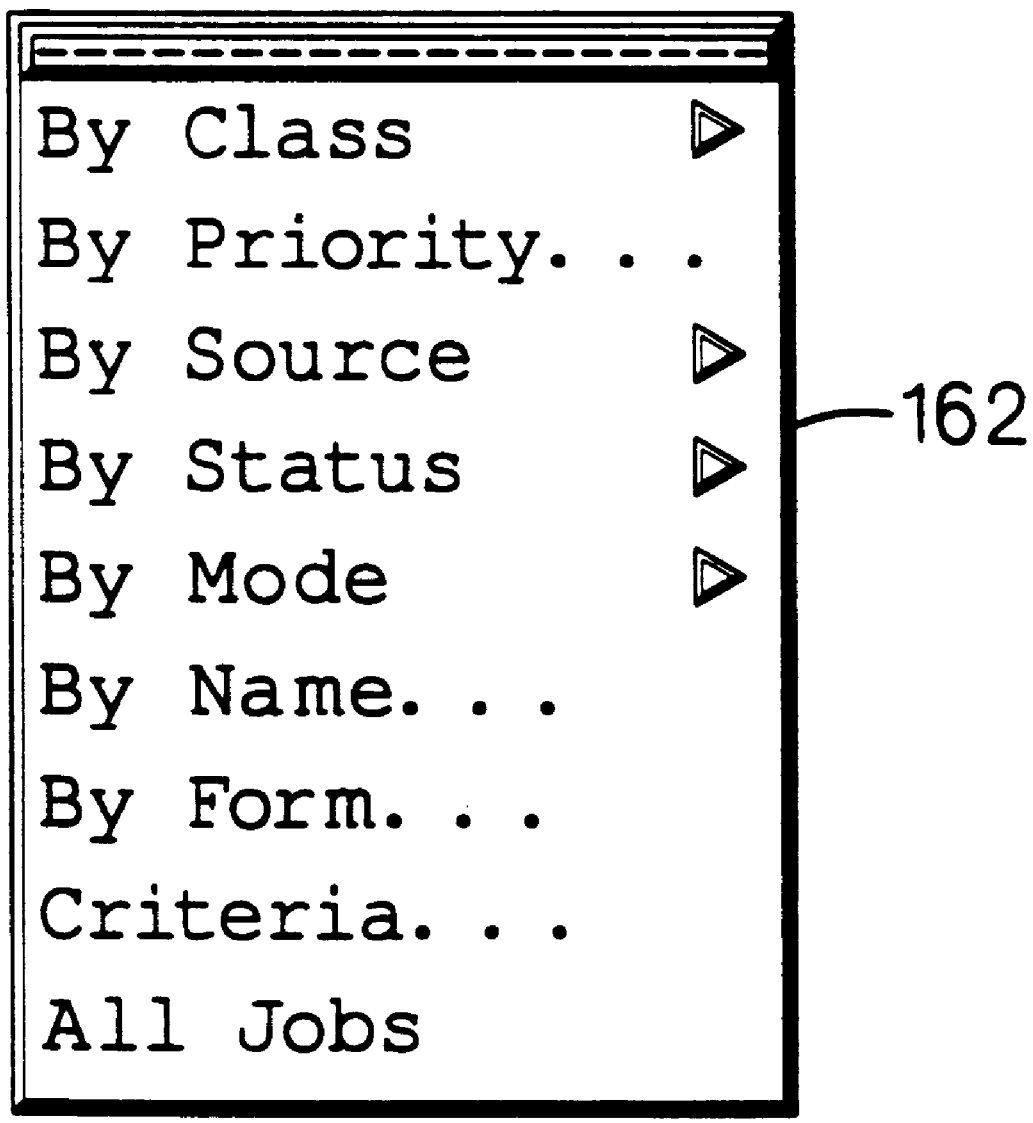

Referring to FIG. 9, the operator may select a Job Queue option 156 from a View menu 158 to cause a Job Queue Status table 160 to be displayed. The operator may then sort the Job Queue Status table display using options 162 (FIG. 10) in a Job Queue Status table View menu 164. These sort by options include class, priority, source, status, mode, name, form, criteria, or all jobs.

Figure 11:
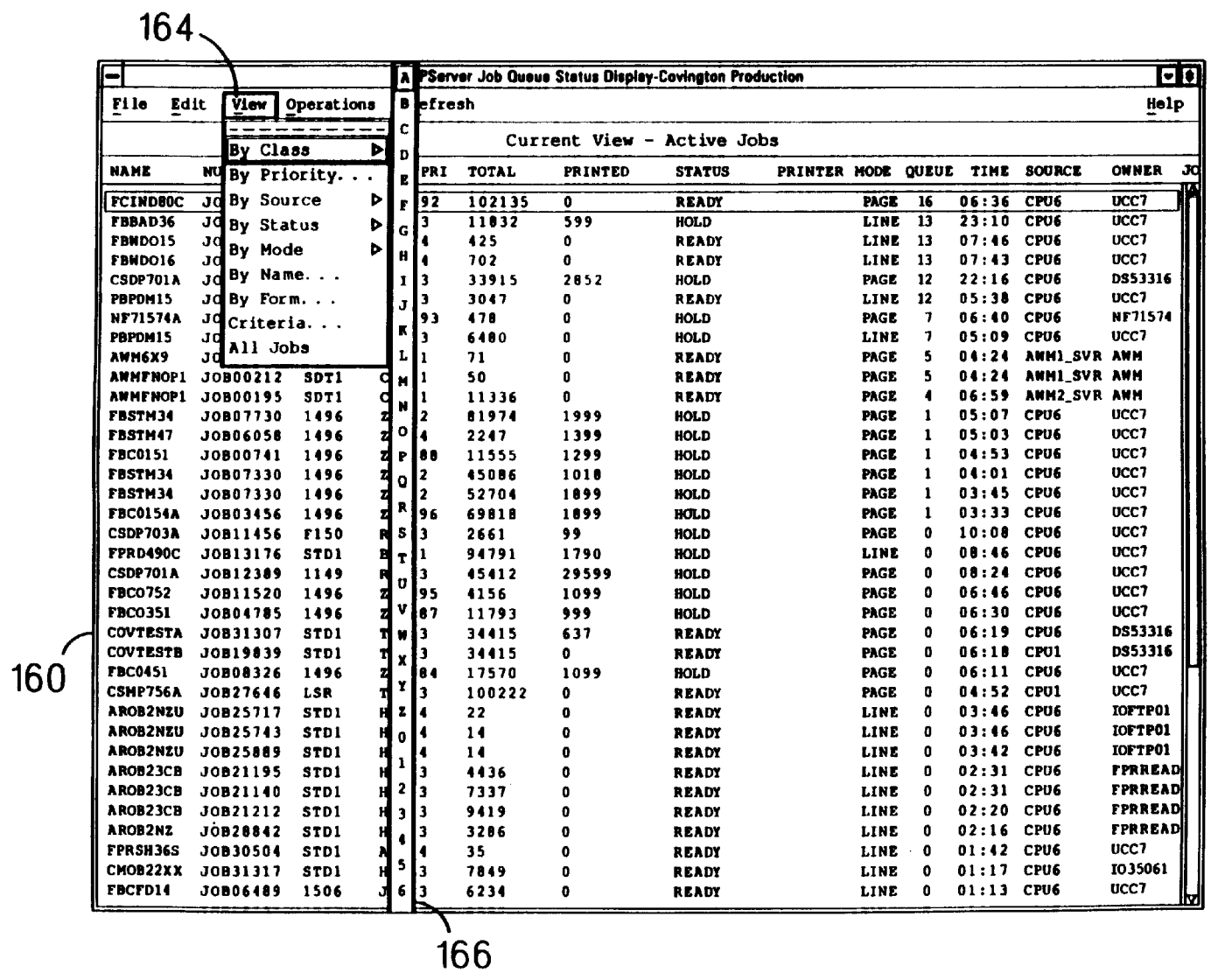
Figure 12:
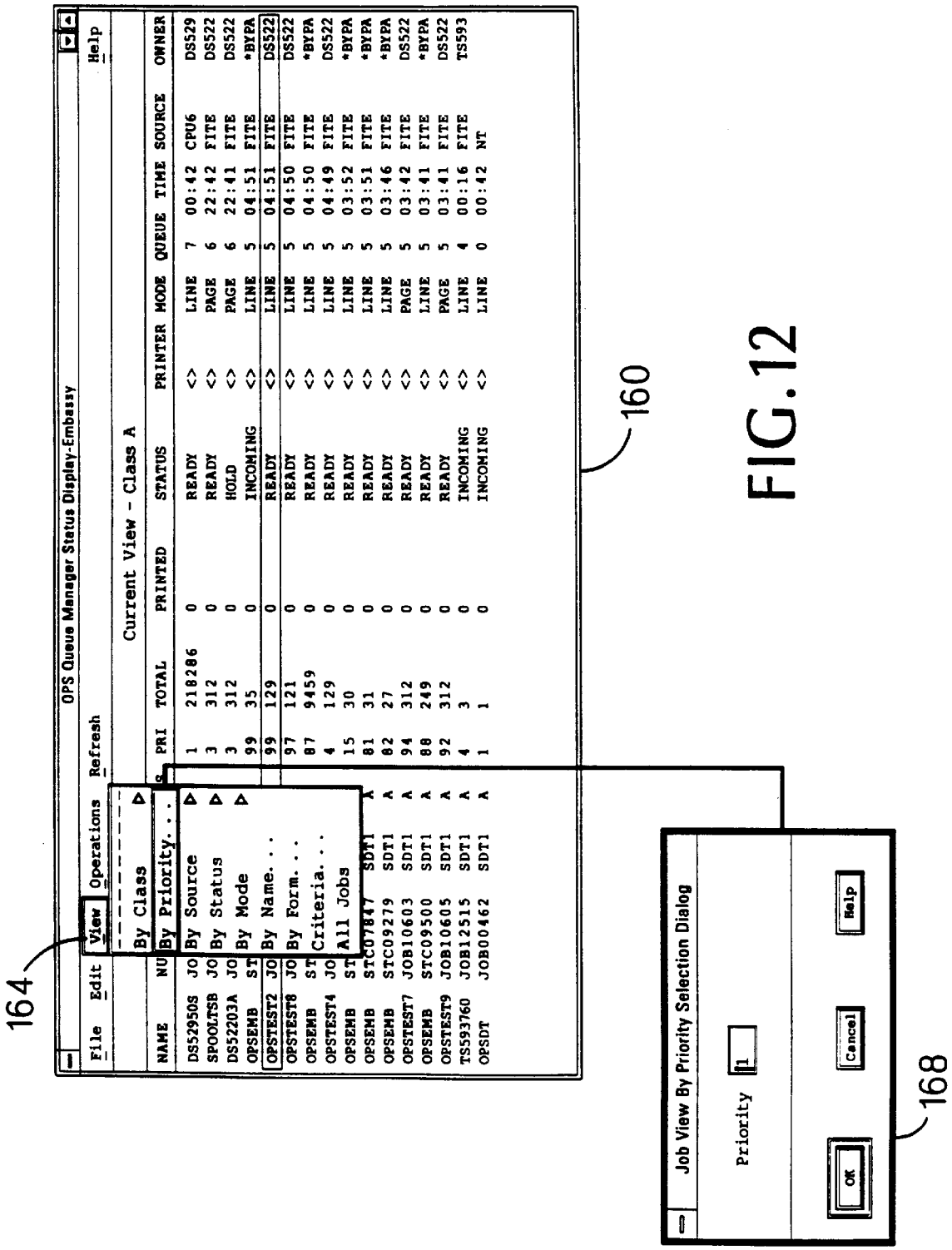
Figure 13:
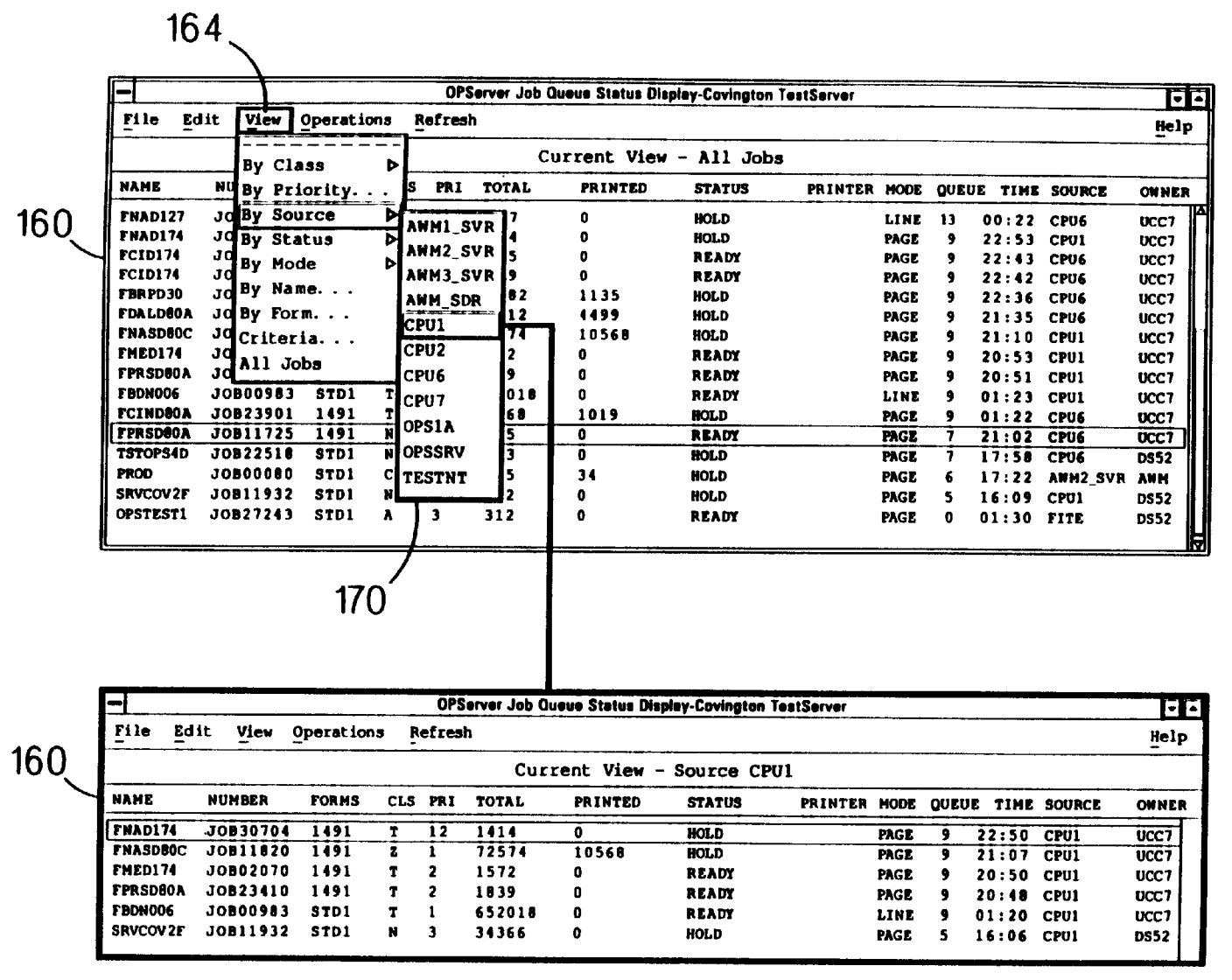
Figure 14:
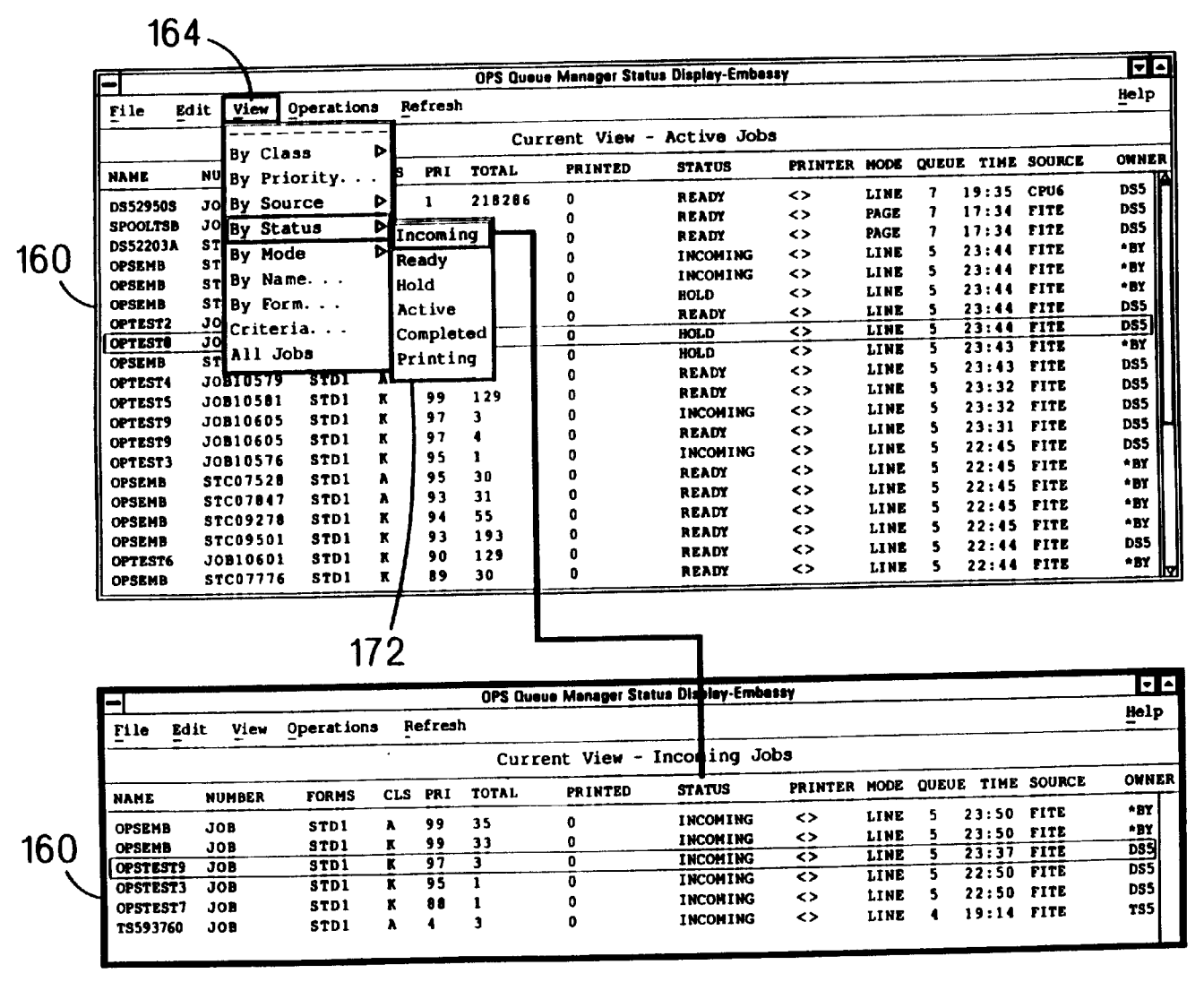
Figure 15:
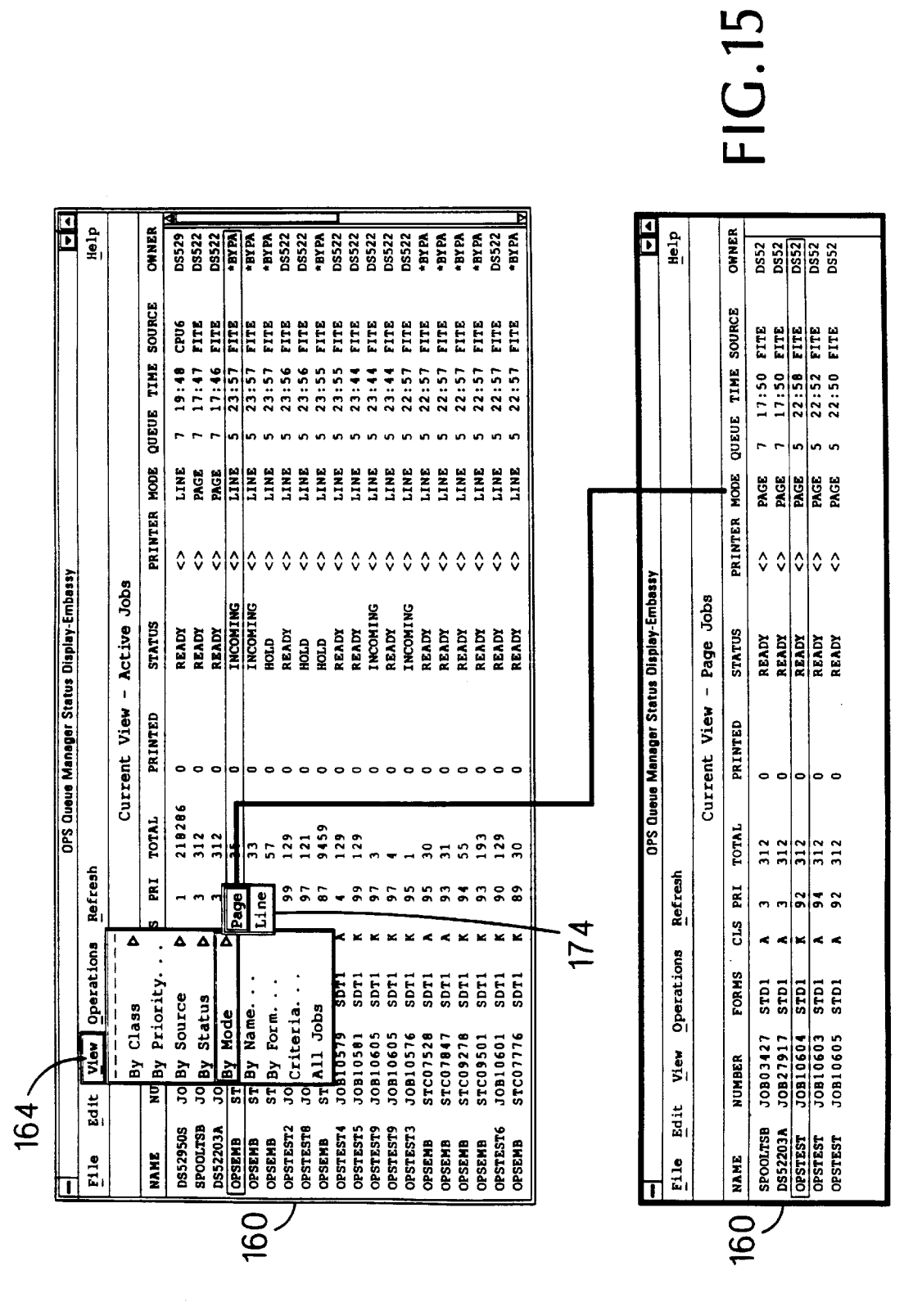
Figure 16:
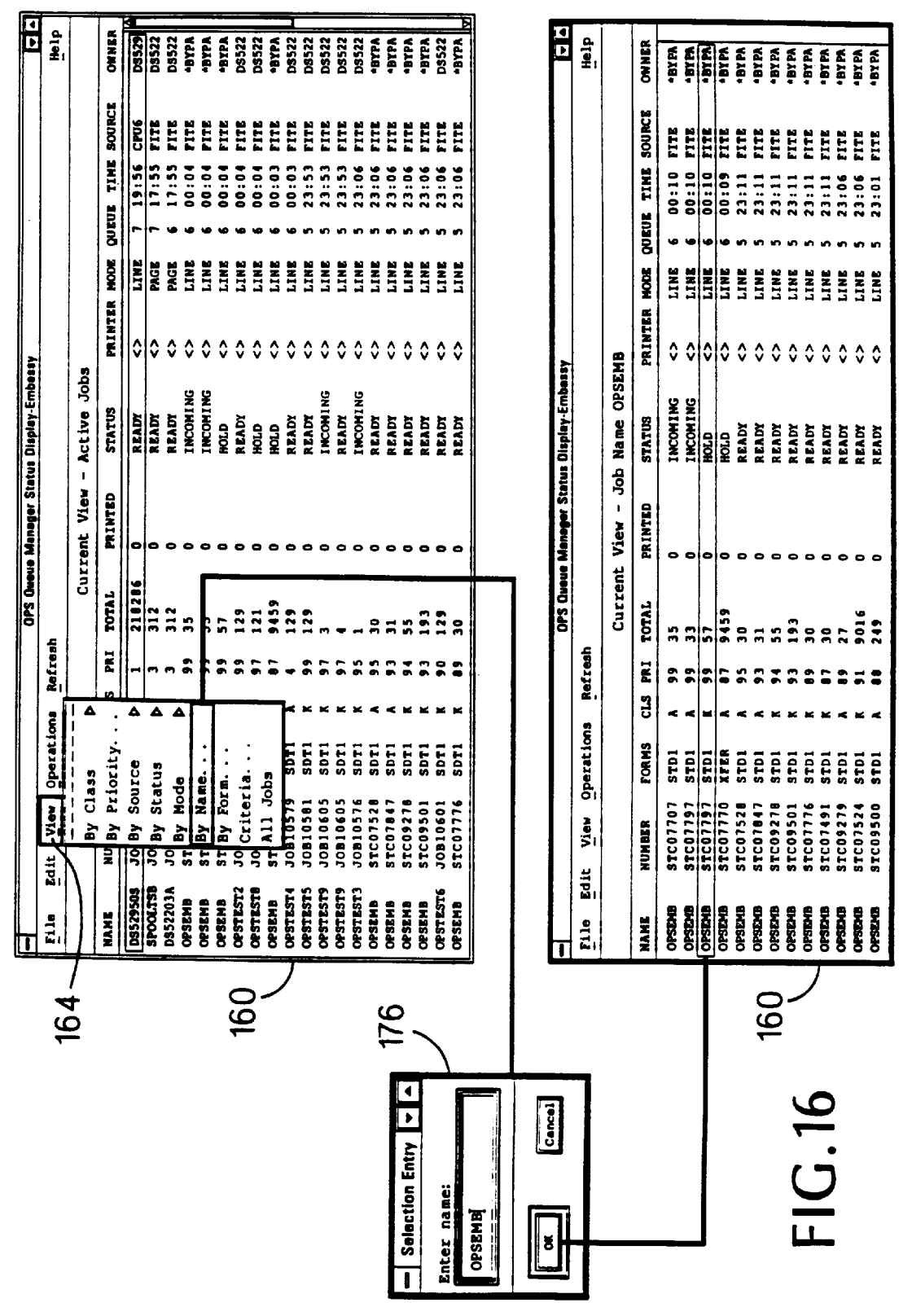
Figure 17:
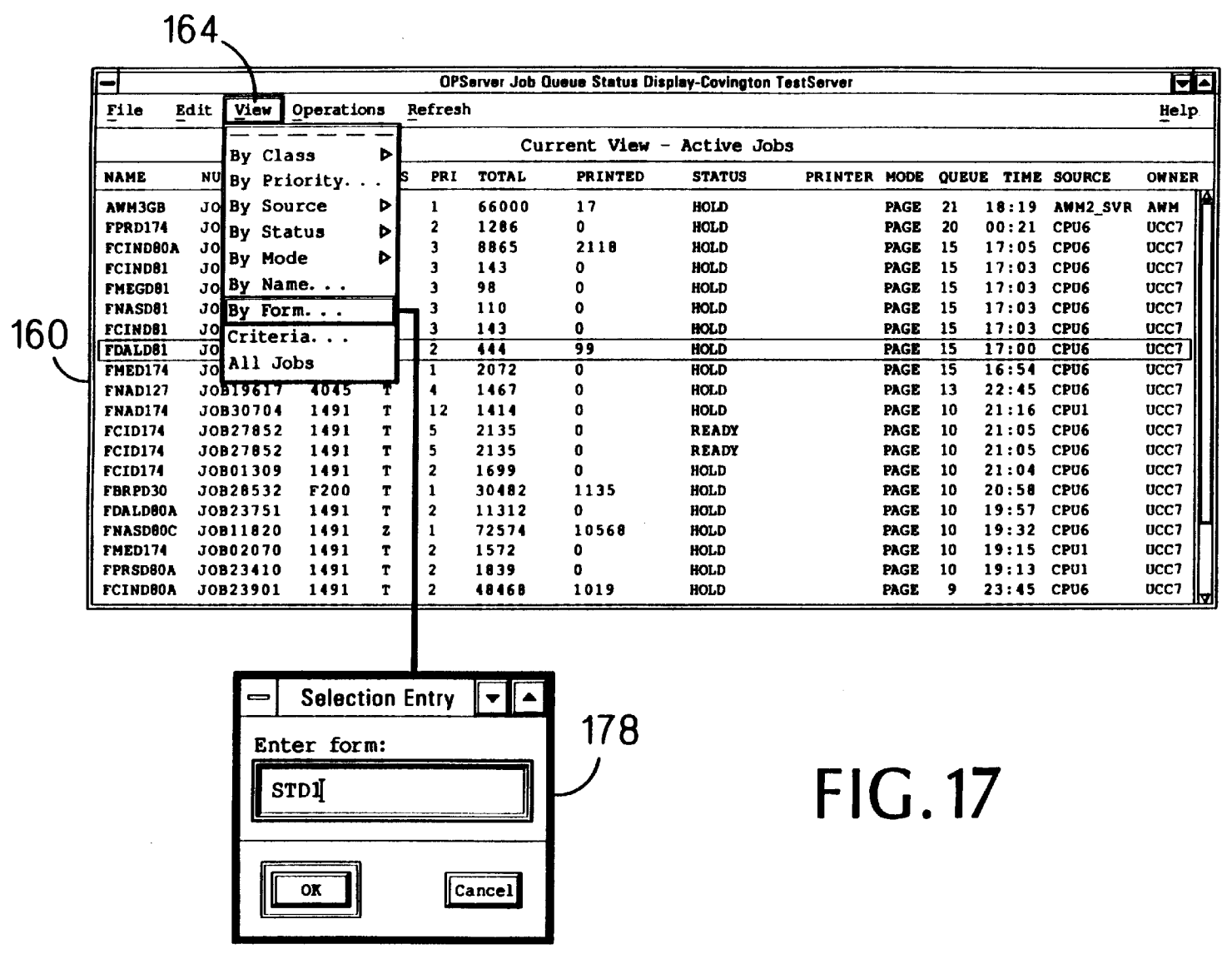

When the class option is selected, a class pop-up menu 166 (FIG. 11) of alpha codes from A through Z and numeric codes from 0 through 9 is displayed representing classes that the Job Queue Status table may be sorted on. The operator may then select one of these codes to sort the Job Queue Status table. When the priority option is selected, a Job View By Priority Selection Dialog box 168 (FIG. 12) is displayed. The operator may enter the priority on which he would like the Job Queue Status table sorted on. When the source option is selected, a source computer pop-up menu 170 (FIG. 13) is displayed from which the operator may select a source computer to sort the Job Queue Status table on, and when the status option is selected, a status pop-up menu 172 (FIG. 14) is displayed from which the operator may select a status to sort the Job Queue Status table on. Similarly, when the mode option is selected, a mode pop-up menu 174 (FIG. 15) is displayed, when the name or form options are selected, a Selection Entry dialog box 176 (FIG. 16), 178 (FIG. 17), respectively, is displayed, and when the criteria option is selected, a Criteria Display dialog box 180 (FIG. 18) is displayed through which the operator can select a combination of criteria, such as class and priority, to sort on. The operator may select the all jobs option to cause all jobs to be displayed in the Job Queue Status table.

Figure 19:
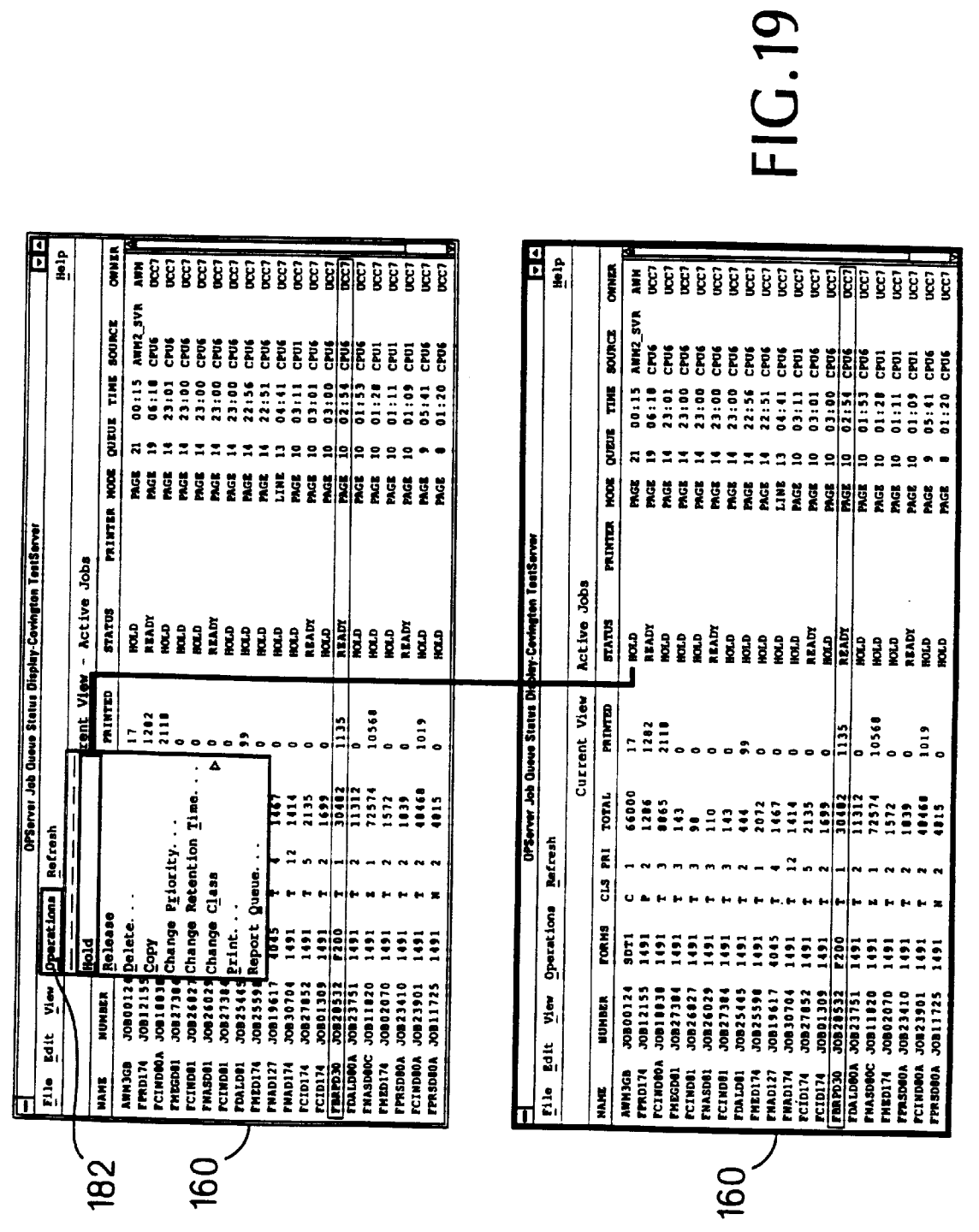
Figure 20:
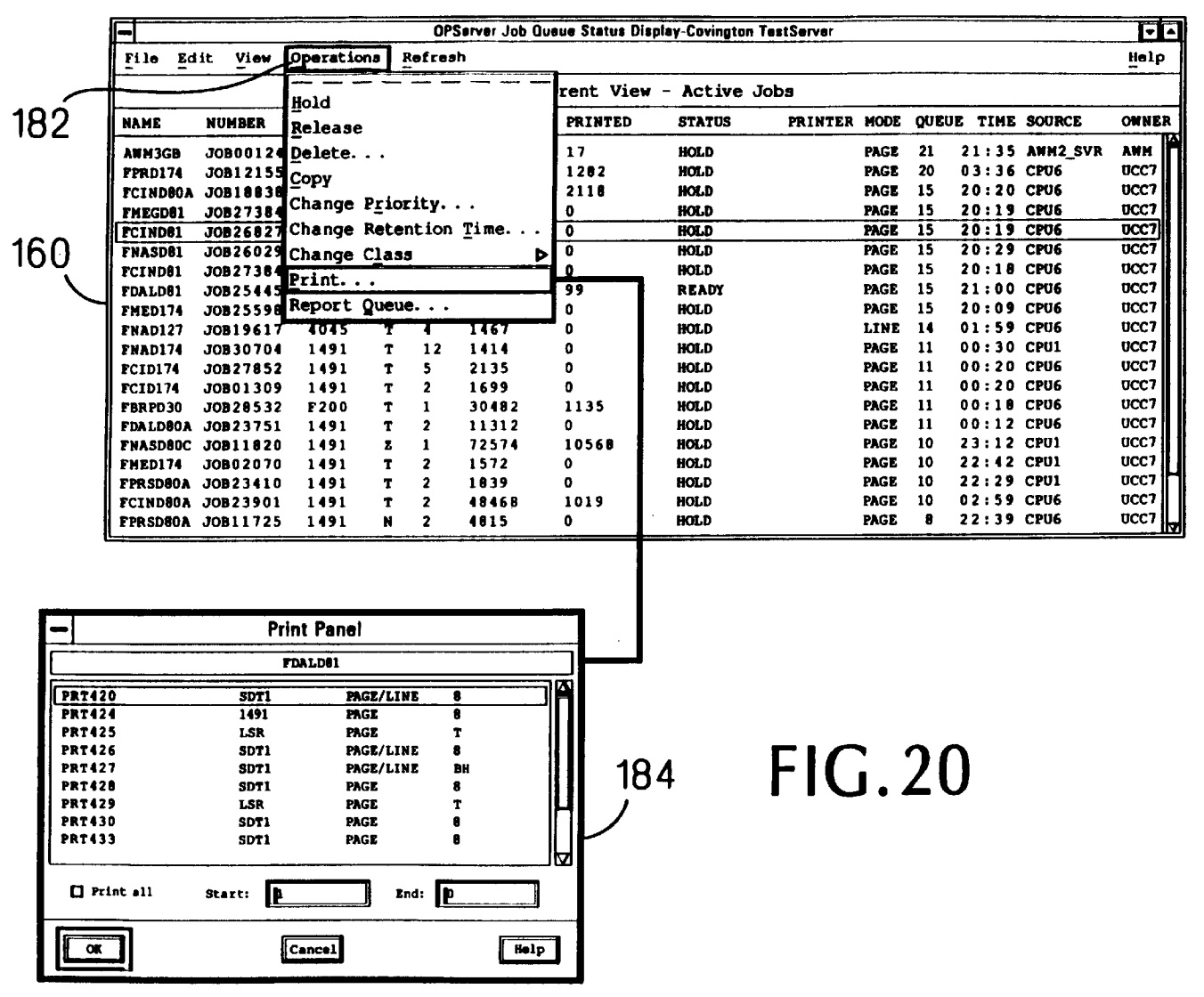

To perform an operation on a job, the operator selects the job in the Job Queue Status table by clicking the left mouse button on the desired job and selects the desired operation from the Operations menu 182 (FIG. 19). The operations include Hold, Release, Delete, Copy, Change Priority, Change Retention Time, Change Class, Print, and Report Queue. The Hold option allows the operator to put a print job on hold, and the Release option allows the operator to change the status of a print job to ready. When a print job has a ready status, the operator may print the job by selecting the print option and a desired printer from a Print Panel 184 (FIG. 20) or by moving the cursor over the job in the Job Queue Status table, pressing the left mouse button down, and dragging-and-dropping the print job onto the desired printer icon (i.e., drag-and-drop technology). If the print job set-up does not match the printer set-up, for example, the form required for the print job is not loaded on the printer, then the GUI indicates that the print job cannot be printed on the selected printer by not allowing the print option to be selected or by not allowing the print job to be dropped onto the printer icon.

Alternatively, the open print server may be configured to automatically print jobs with a ready status if a printer having a matching set-up is available.

Figure 21:
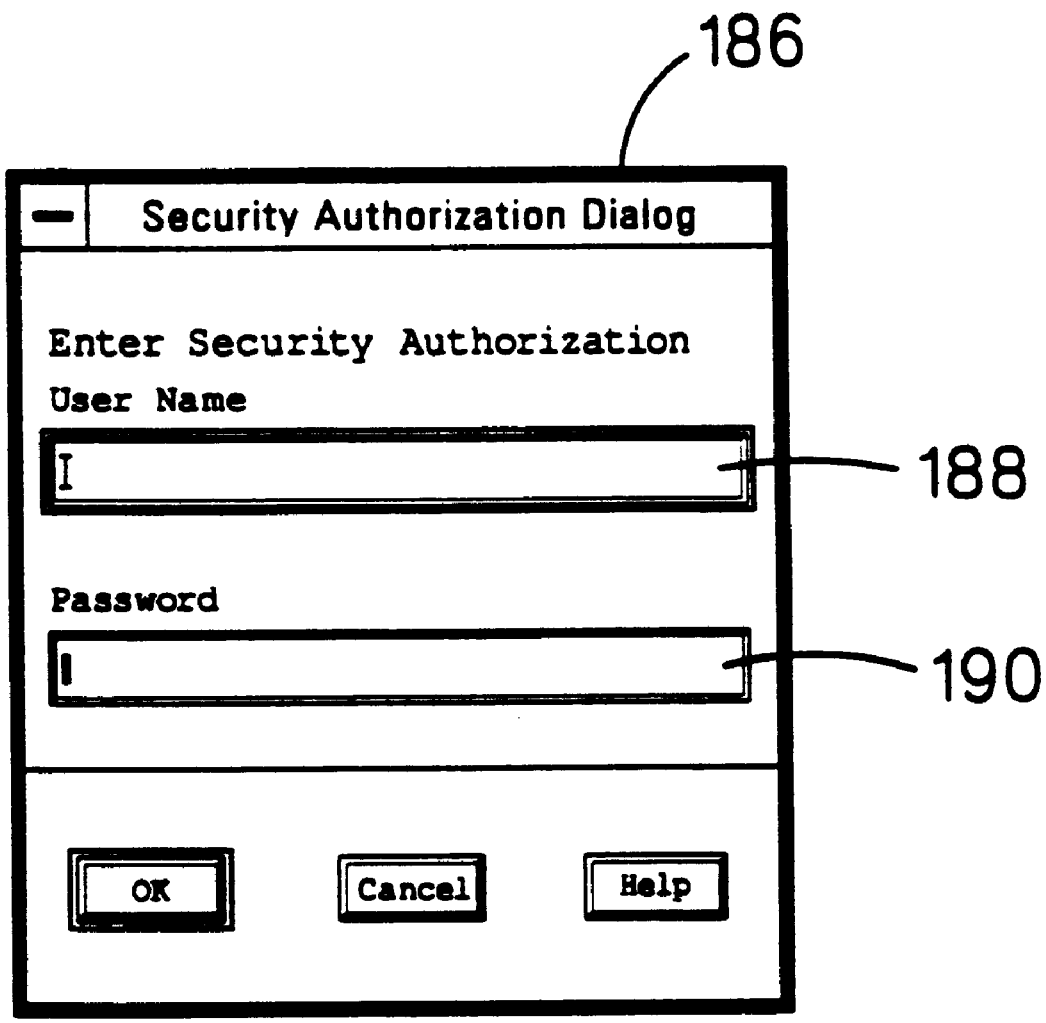

If a job in a secure class is selected, a Security Authorization Dialog box 186 (FIG. 21) is displayed, and the operator must enter an authorized user name 188 and password 190 before an operation may be performed on the selected job.

Figure 22:
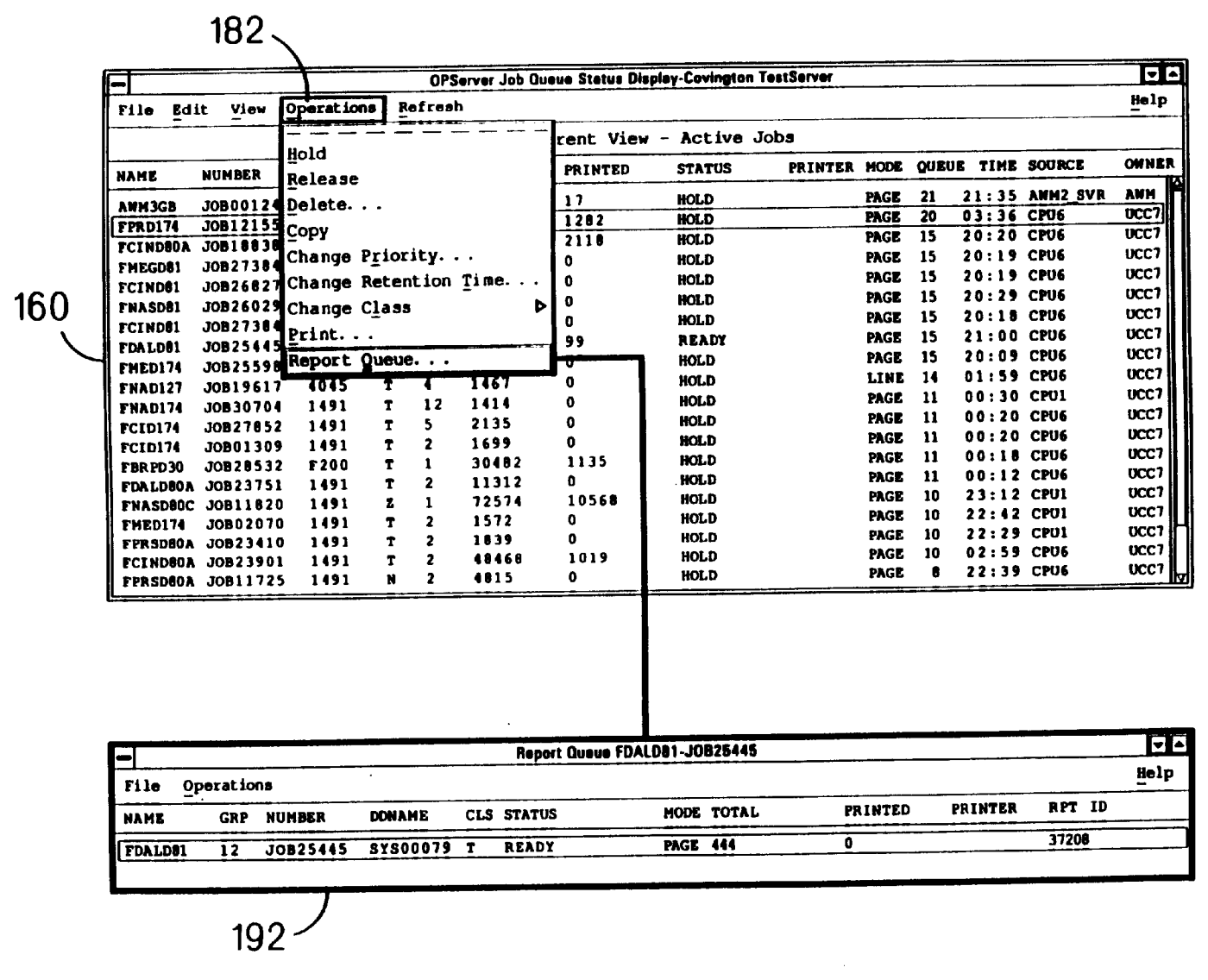
Figure 24:
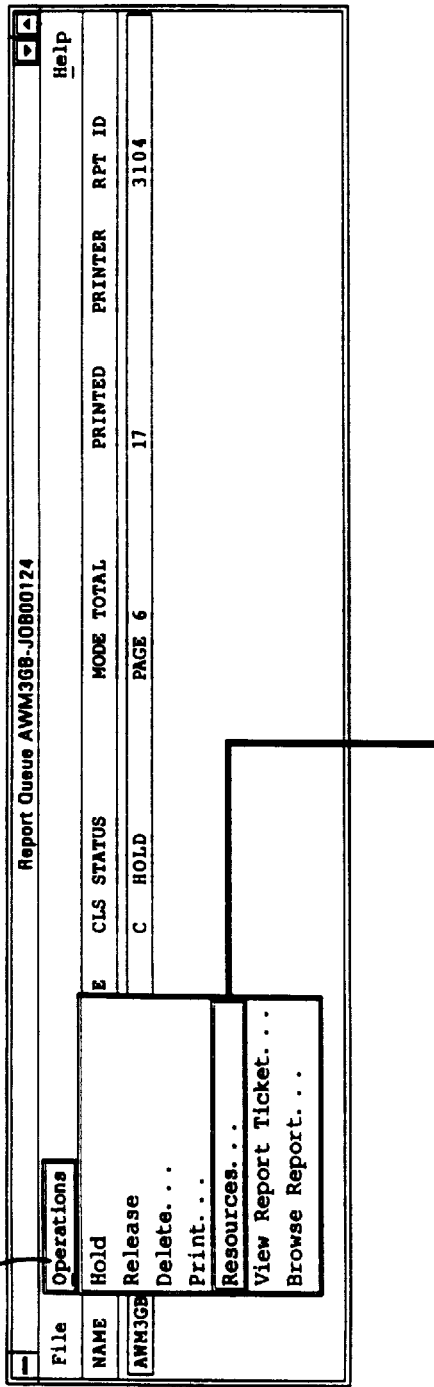
Figure 25:
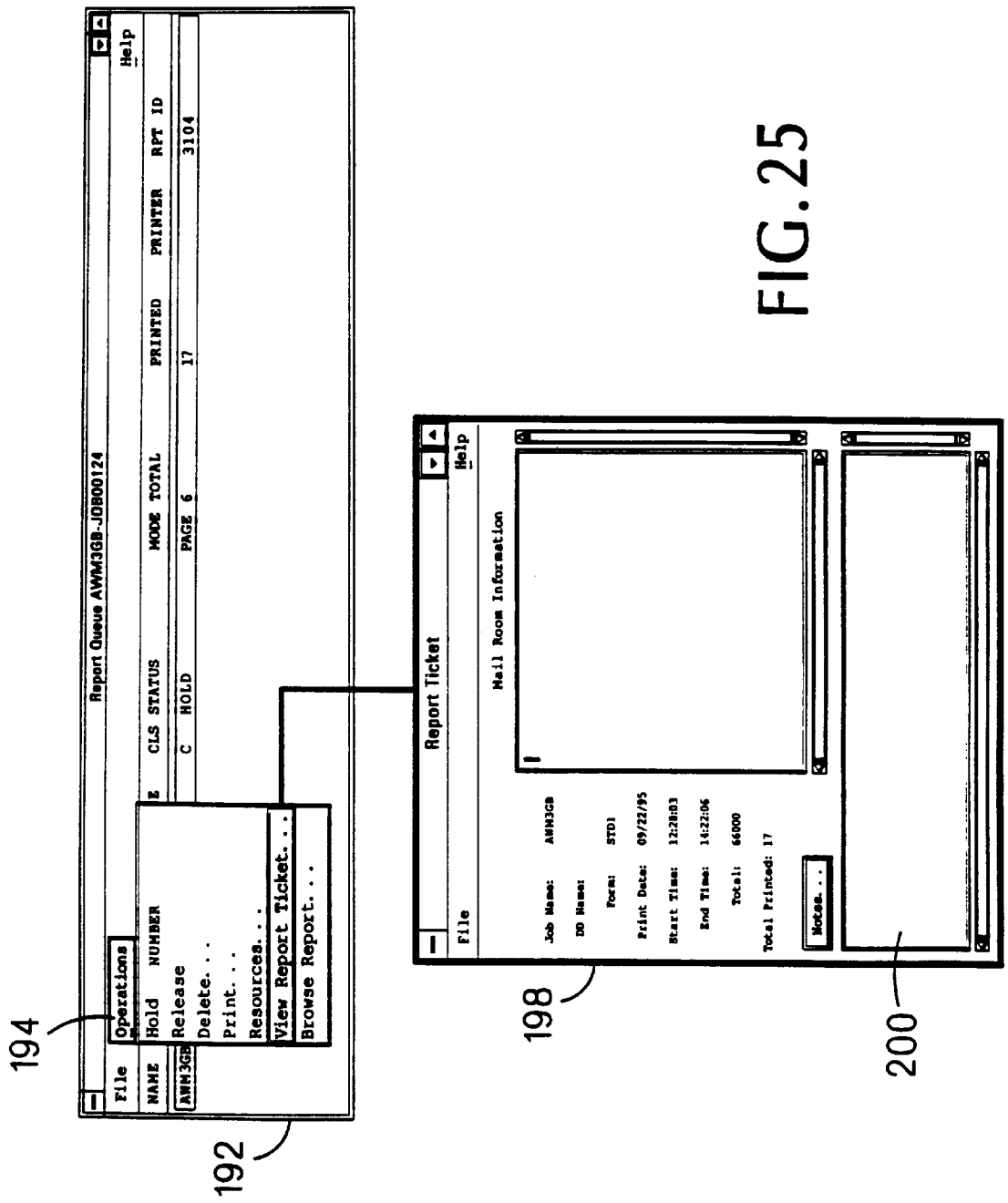

Each print job may contain one or more reports (i.e., smaller print jobs). When the report queue option is selected, a Report Queue window 192 (FIG. 22) is displayed. The Report Queue window provides many of the same operational controls at the report level through an Operations menu 194 (FIG. 23) that are provided at the job level through the operations menu in the Job Queue Status table. Report operations include Hold, Release, Delete, Print, Resources, View Report Ticket, and Browse Report. The Hold, Release, Delete, and Print report operations work as described above with respect to print jobs. When the Resources option is selected, a Resources Display window 196 (FIG. 24) is displayed. The Resources Display window shows a list of printer resources required to print the selected report. Each necessary printer resource also includes a status: Unchecked indicates that the Queue Manager has not determined whether the resource is available in the resource manager; Missing indicates that the resource is not available through the resource manager; and Present indicates that the resource is available. Selecting the view report ticket option displays a Report Ticket window 198 (FIG. 25). The following information about a selected report is displayed: job name; data definition name; form used; print date; print start time; print end time; total lines in report; and total pages printed. An operator or a user connected to a source computer may add notes to a report in a notes dialog box 200. For example, the user may add a note telling the operator where to send copies of each report. Selecting the Report Browser option displays a Report Browser window 202 (FIG. 26). The Report Browser window displays the actual contents of a selected report.

Figure 27:
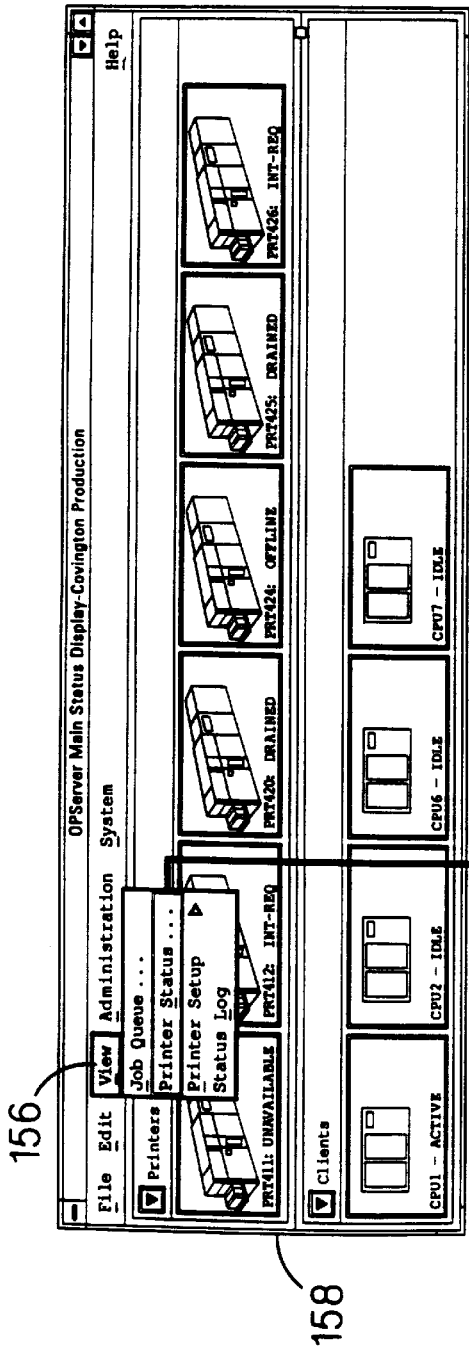
Figure 28:
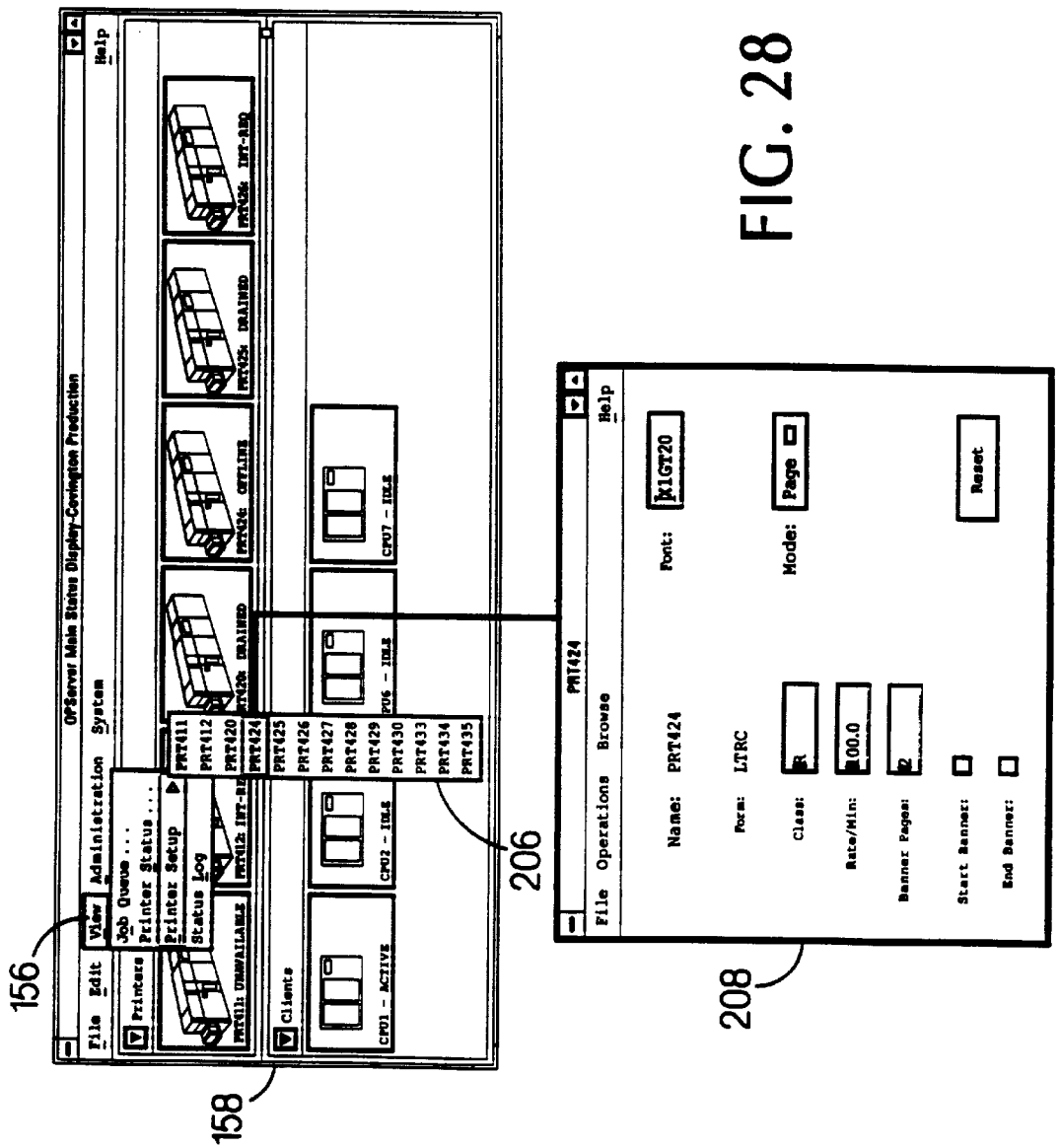
Figure 29:
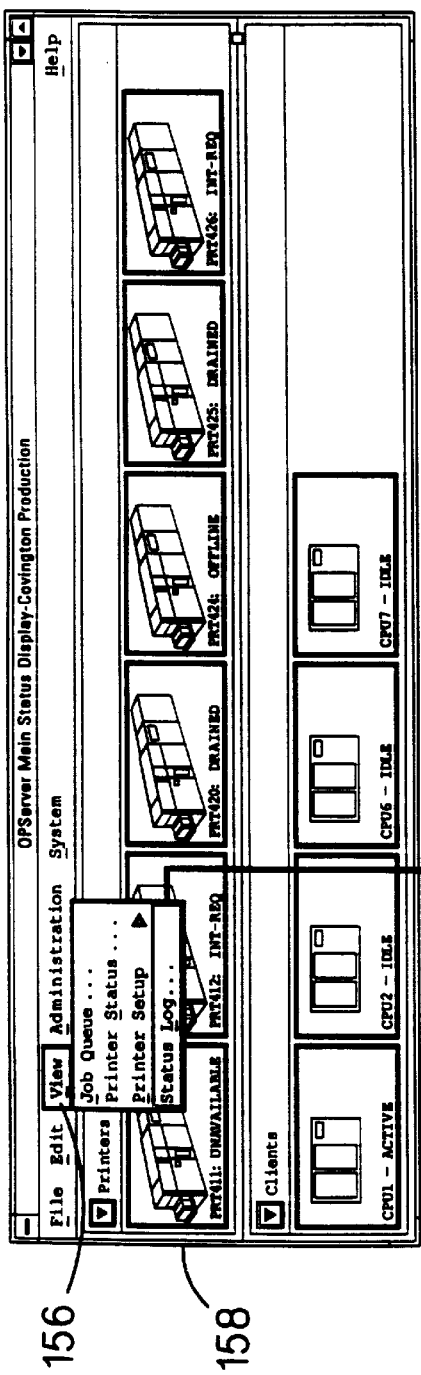

Referring back to FIG. 9, selecting the printer status option from the View menu of the Main Status Display window displays a Printer Status display window 204 (FIG. 27) including a one line status summary for each printer. Through the printer set-up option in the View menu, the operator may configure available printers. When this option is selected, a pop-up menu 206 (FIG. 28) of available printers is displayed, and when a printer is selected from this menu or the operator double-clicks on the printer icon, a printer configuration dialog box 208 is displayed. The operator enters information into this dialog to configure the corresponding printer. Selecting the status log option causes a Status Log 210 (FIG. 29) to be displayed allowing the operator to view and search for recorded events.

Figure 30:
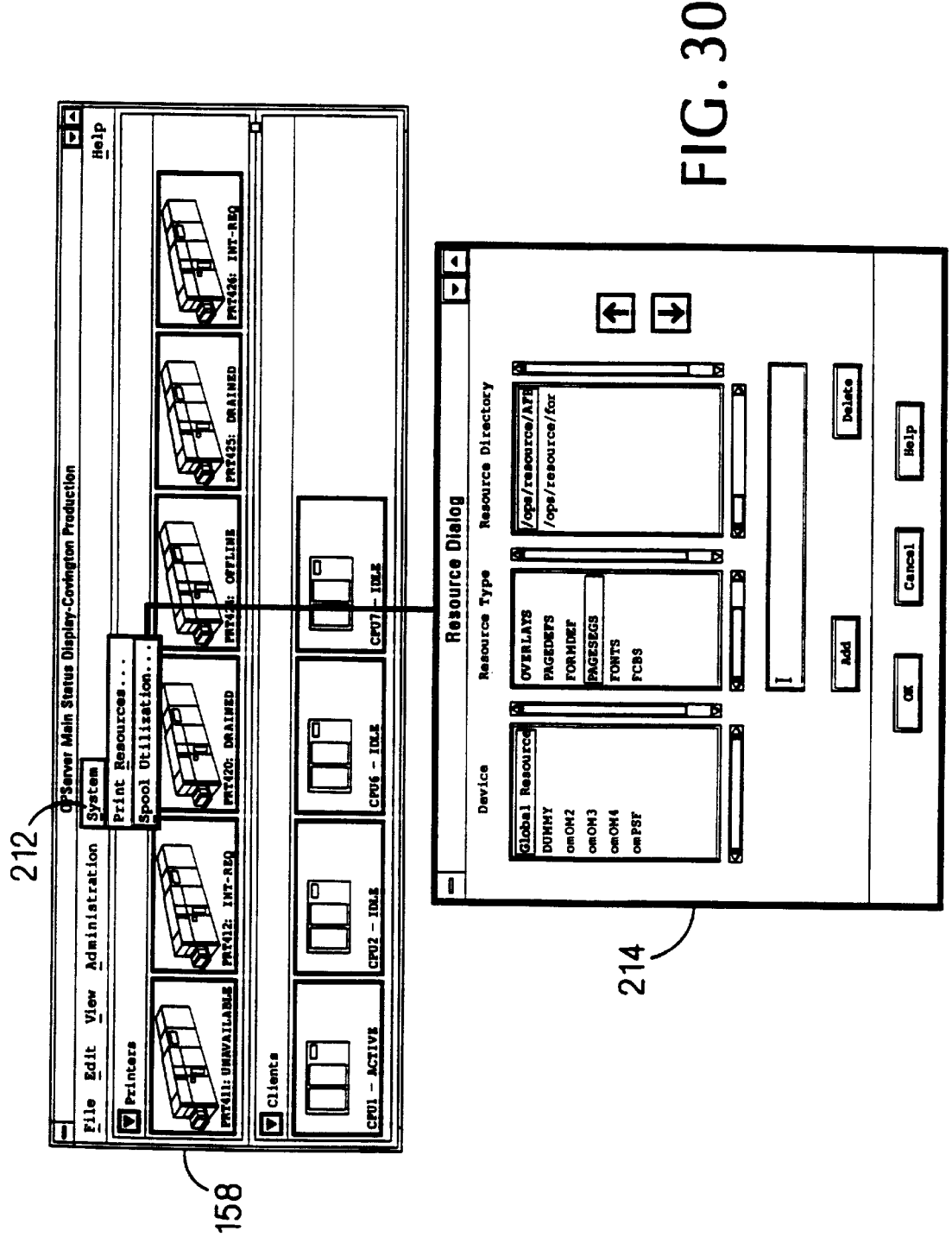
Figure 31:
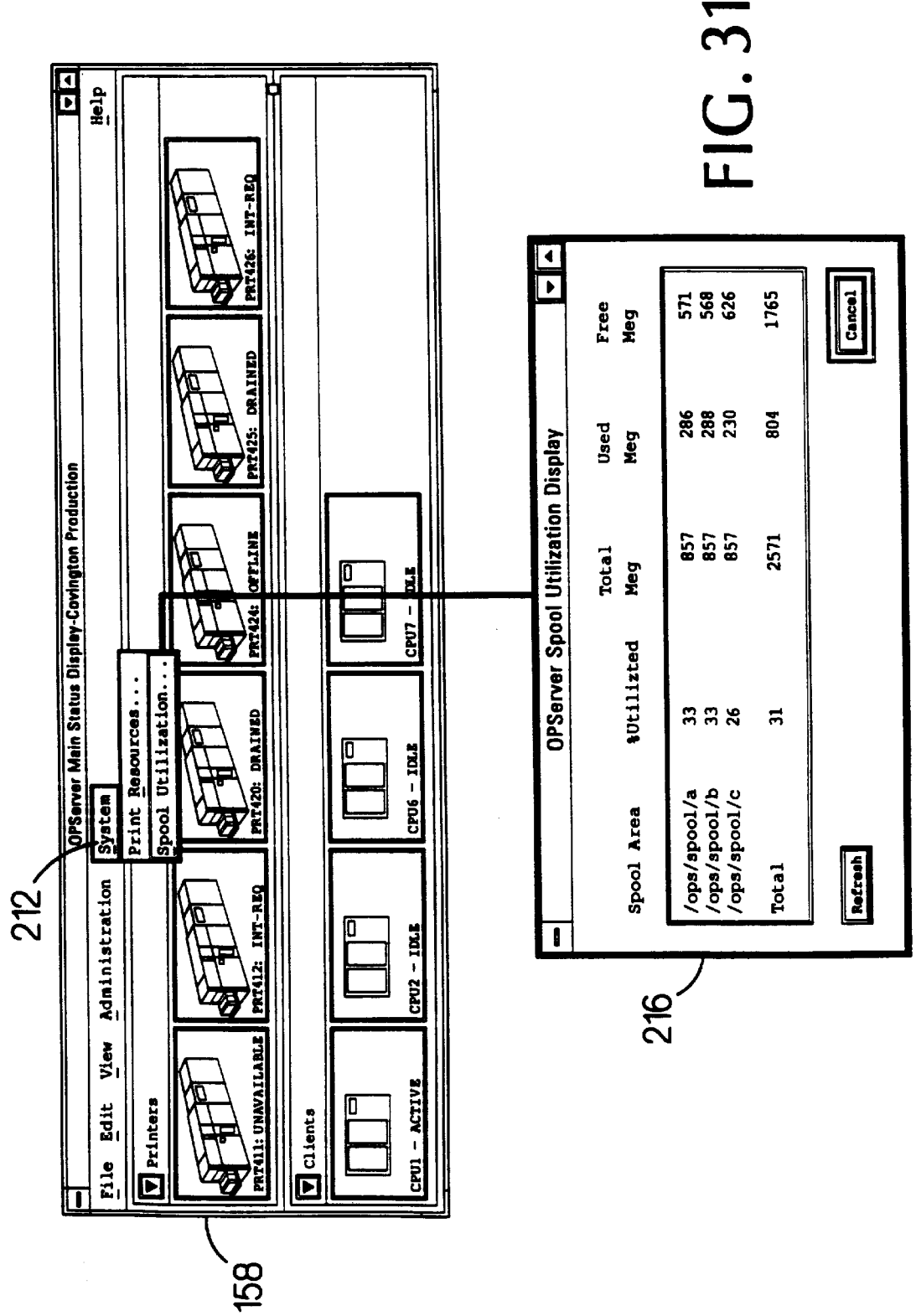

System menu 212 (FIG. 30) includes a Print Resource option and a Spool Utilization option. Selecting the Print Resource option displays a Resource Dialog box 214. The Resource Dialog box displays existing resource directory paths for the selected printer and allows the operator to add and delete resource directory paths for the selected printer. Selecting the Spool Utilization option displays a Spool Utilization window 216 (FIG. 31). The Spool Utilization window displays the path name of each directory, the percentage of the total space currently used, total number of megabytes, total number of megabytes currently in use, total number of megabytes available for storage, and total megabytes for each column.

Reference to Microfiche Appendix

A microfiche appendix containing C language source code for open systems printing consisting of 1648 microfiche images on 17 microfiche cards is filed herewith. A portion of the disclosure of the patent document contains material which is subject to copyright protection. The copyright owners have no objection to the facsimile reproduction by anyone of the patent document or the patent disclosure, as it appears in the Patent and Trademark Office patent file or records, but otherwise reserves all copyright rights whatsoever.

Other embodiments are within the following claims.

For example, multiple open print servers at locations remote from the source computers may be connected to a common TCP/IP network.

As another example, the term "printers" as used in this specification refers to many different types of devices, including, but not limited to, paper printers, e-mail, computer output microfiche (COM) recorders, archival systems, or computer output laser disk (COLD) recorders.

What is claimed is:

1. A method comprising
    sending a first multiple pages print job automatically from a source computer to a print server without the source computer having selected a printer for the print job, the source computer being one of multiple source computers of different types connected in a first network;
    sending the first multiple pages print job from the print server to a selected output manager connected to at least one printer, the selected output manager being one of multiple output managers connected in a second network, each of the output managers being connected to at least one printer included in a plurality of printers, at least some of the printers being of different types;
    sending the first multiple pages print job from the selected output manager to a first one of the printers;
    sending a second multiple pages print job automatically from any one of the source computers to the print server without the source computer having selected a printer for the second multiple pages print job;
    sending the second multiple pages print job from the print server to a selected one of the output managers; and
    sending the second multiple pages print job from the selected output manager to a second one of the printers, the first multiple pages print job and the second multiple pages print job being printed in parallel on the first and second printers respectively.

2. A method comprising:
    sending a first multiple pages print job automatically from a source computer to a print server without the source computer having selected a printer for the print job, the source computer being one of an arbitrary number of source computers;
    sending the first multiple pages print job from the print server to a selected output manager connected to at least one printer, the selected output manager being one of multiple output managers, each of the output managers being connected to an arbitrary number of printers;
    sending the first multiple pages print job from the selected output manager to a first one of the printers;
    sending a second multiple pages print job automatically from any one of the source computers to the print server without the source computer having selected a printer for the second multiple pages print job;
    sending the second multiple pages print job from the print server to a selected one of the output managers; and
    sending the second multiple pages print job from the selected output manager to a second one of the printers, the first multiple pages print job and the second multiple pages print job being printed in parallel on the first and second printers respectively.

3. The method of claim 1 or 2, wherein the multiple pages print jobs are sent from the source computers to the print server over a first network and the multiple pages print jobs are sent from the print server to the output managers over a second network.

4. The method of claim 3, wherein the first network comprises a TCP/IP network and the second network comprises a local area network.

5. The method of claim 1 or 2, further comprising:
    transforming data in the multiple pages print jobs into a format compatible with the printers.

6. The method of claim 5, wherein the data is transformed by the print server.

7. The method of claim 5, wherein the data is transformed by the output managers.

8. The method of claim 1 or 2, further comprising, after sending the multiple pages print jobs from the source computers to the print server:
    storing the multiple pages print jobs in a server spool coupled to the print server.

9. The method of claim 1 or 2, further comprising, before sending the multiple pages print jobs from the print server to the output managers:
    manipulating data in the multiple pages print jobs.

10. The method of claim 1 or 2, further comprising, before sending a multiple pages print job from the print server to the selected output manager:
    merging at least one other multiple pages print job with the multiple pages print job into a single multiple pages print job.

11. The method of claim 1 or 2, further comprising:
    printing the multiple pages print jobs on paper.

12. The method of claim 1 or 2, further comprising:
    sending the multiple pages print jobs to an electronic mail system.

13. The method of claim 1 or 2, further comprising:
    recording the multiple pages print jobs on microfiche.

14. The method of claim 1 or 2, further comprising:
    recording the multiple pages print jobs on laser disk.

15. The method of claim 1 or 2 further comprising sending individual reports from the print server to the output managers connected to the printers, wherein each of the multiple pages print jobs includes at least two reports.

16. The method of claim 1 or 2, further comprising, after sending the multiple pages print jobs from the source computers to the print server:
bringing the source computers down for maintenance while printing the multiple pages print jobs.

17. A method comprising
sending a first print job including at least two reports automatically from a source computer to a print server, the source computer being one of multiple source computers of different types connected in a first network;
sending individual reports included in the first print job from the print server to a selected output manager connected to at least one printer, the selected output manager being one of multiple output managers connected in a second network, each of the output managers being connected to at least one printer included in a plurality of printers, at least some of the printers being of different types;
sending the individual reports included in the first print job from the selected output manager to a first one of the printers;
sending a second print job including at least two reports automatically from any one of the source computers to the print server;
sending individual reports included in the second print job from the print server to a selected one of the output managers; and
sending the individual reports included in the second print job from the selected output manager to a second one of the printers,
the individual reports included in the first print job and the individual reports included in the second print job being printed in parallel on the first and second printers respectively.

18. A method comprising:
sending a first print job including at least two reports automatically from a source computer to a print server, the source computer being one of an arbitrarm number of source computers;
sending individual reports included in the first print job from the print server to a selected output manager connected to at least one printer, The selected output manager being one of multiple output managers, each of the output managers being connected to an arbitrary number of printers;
sending the individual reports included in the first print job from the selected output manager to a first one of the printers;
sending a second print job including at least two reports automatically from any one of the source computers to the print server;
sending individual reports included in the second print job from the print server to a selected one of the output managers; and
sending the individual reports included in the second print job from the selected output manager to a second one of the printers,
the individual reports included in the first print job and the individual reports included in the second print job being printed in parallel on the first and second printers respectively.

19. The method of claim 17 or 18 further comprising
enabling an operator of the print server to control printing operations for each of the individual reports.

* * * * *

UNITED STATES PATENT AND TRADEMARK OFFICE
Certificate

Patent No. 6,337,745 B1　　　　　　　　　　　　　　　　　　　　　　　　Patented: January 8, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Albert Aiello, Jr., Wellesley, MA; Clive H. Moss, Winchester, MA; and Oren S. Leiman, Groton, MA.

Signed and Sealed this Thirteenth Day of April 2004.

DAVID K. MOORE
*Supervisory Patent Examiner*
Art Unit 2624